United States Patent
Harada et al.

(10) Patent No.: US 10,633,549 B2
(45) Date of Patent: Apr. 28, 2020

(54) INK, INK ACCOMMODATING CONTAINER, IMAGE FORMING METHOD, AND IMAGE FORMING DEVICE

(71) Applicants: Shigeyuki Harada, Shizuoka (JP); Takuya Yamazaki, Kanagawa (JP)

(72) Inventors: Shigeyuki Harada, Shizuoka (JP); Takuya Yamazaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/217,091

(22) Filed: Dec. 12, 2018

(65) Prior Publication Data

US 2019/0264050 A1 Aug. 29, 2019

(30) Foreign Application Priority Data

Feb. 27, 2018 (JP) ................................. 2018-033374

(51) Int. Cl.
   *C09D 11/322* (2014.01)
   *B41J 29/13* (2006.01)
   (Continued)

(52) U.S. Cl.
   CPC ......... *C09D 11/322* (2013.01); *B41J 2/17509* (2013.01); *B41J 2/17513* (2013.01);
   (Continued)

(58) Field of Classification Search
   CPC ... B41J 2/01; B41J 2/211; B41J 2/1433; B41J 2/17; B41J 2/17593; B41J 2/2107;
   (Continued)

(56) References Cited

U.S. PATENT DOCUMENTS

2014/0198160 A1* 7/2014 Harada ................. B41J 2/2107
                                                        347/86
2015/0056425 A1   2/2015 Nagai et al.
(Continued)

FOREIGN PATENT DOCUMENTS

EP   3 272 776 A1   1/2018
JP   3-160068       7/1991
(Continued)

OTHER PUBLICATIONS

Extended European Search Report dated Jul. 3, 2019 in European Patent Application No. 18213567.3, 6 pages.

*Primary Examiner* — Manish S Shah
(74) *Attorney, Agent, or Firm* — Oblon, McClelland, Maier & Neustadt, L.L.P.

(57) ABSTRACT

An ink includes water; a coloring material, and a polymer including a structure unit represented by the following Chemical formula 1 and a structure unit represented by the following Chemical formula 2 or the following Chemical formula 3, Chemical formula 1

(Continued)

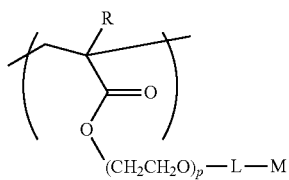

Chemical formula 2

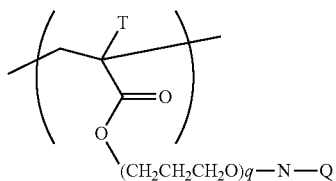

Chemical formula 3 where R and T each, independently represent hydrogen atoms or methyl groups, L and N each, independently represent single bonds or carbonyl groups, M and Q each, independently represent naphthyl groups or biphenyl groups, p represents an integer of from 2 to 12, and q represents an integer of from 1 to 3.

11 Claims, 1 Drawing Sheet

(51) Int. Cl.
  *B41J 2/175* (2006.01)
  *B41J 29/02* (2006.01)
  *C09D 11/38* (2014.01)
  *C09D 11/40* (2014.01)

(52) U.S. Cl.
  CPC ............... *B41J 29/02* (2013.01); *B41J 29/13* (2013.01); *C09D 11/38* (2013.01); *B41J 2/17553* (2013.01); *C09D 11/40* (2013.01)

(58) Field of Classification Search
  CPC ...... B41J 2/1755; B41J 2/2114; B41J 2/2117; B41J 2/2056; B41J 2/21; B41J 2/0057; B41J 3/60; B41J 2002/012; B41J 2/04598; B41J 3/4078; B41J 11/002; B41J 29/377; B41J 2/161; B41J 2/1623; B41J 2202/00; B41J 2202/03; B41J 2/14201; B41J 2/045; B41J 2/04588; B41J 2/04595; B41J 2/04586; B41J 2/14274; B41J 11/0015; B65H 23/26; B65H 2404/14211; B41M 5/0047; B41M 5/0011; B41M 5/0017; B41M 7/00; B41M 7/0072; B41M 5/52; B41M 5/5218; D06P 5/001; D06B 19/0076; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52
  See application file for complete search history.

(56) References Cited

U.S. PATENT DOCUMENTS

| | | |
|---|---|---|
| 2015/0252203 A1 | 9/2015 | Matsuyama et al. |
| 2015/0291817 A1* | 10/2015 | Katoh .................. C09D 11/107 428/207 |
| 2015/0307734 A1* | 10/2015 | Nonogaki .............. B41J 2/2107 347/20 |
| 2016/0017075 A1 | 1/2016 | Harada et al. |
| 2016/0032037 A1 | 2/2016 | Harada et al. |
| 2016/0075892 A1 | 3/2016 | Harada et al. |
| 2016/0102162 A1 | 4/2016 | Harada et al. |
| 2016/0130452 A1 | 5/2016 | Katoh et al. |
| 2016/0168292 A1* | 6/2016 | Fukuoka ............... C08F 220/10 347/86 |
| 2016/0222234 A1 | 8/2016 | Matsuyama et al. |
| 2016/0362572 A1 | 12/2016 | Matsuyama et al. |
| 2017/0073533 A1 | 3/2017 | Fukuoka et al. |
| 2017/0121544 A1 | 5/2017 | Koizuka et al. |
| 2017/0158794 A1 | 6/2017 | Harada et al. |
| 2017/0174918 A1 | 6/2017 | Yanagawa et al. |
| 2018/0002469 A1 | 1/2018 | Harada et al. |

FOREIGN PATENT DOCUMENTS

| | | |
|---|---|---|
| JP | 2005-298802 | 10/2005 |
| JP | 2006-188624 | 7/2006 |
| JP | 2008-536963 | 9/2008 |
| JP | 2008-257205 | 10/2008 |
| JP | 2012-051357 | 3/2012 |
| JP | 2012-052027 | 3/2012 |
| JP | 2016-145322 | 8/2016 |
| JP | 2017-171875 | 9/2017 |
| WO | WO2006/099551 A2 | 9/2006 |
| WO | WO2007/053563 A2 | 5/2007 |

* cited by examiner

INK, INK ACCOMMODATING CONTAINER, IMAGE FORMING METHOD, AND IMAGE FORMING DEVICE

CROSS-REFERENCE TO RELATED APPLICATION

This patent application is based on and claims priority pursuant to 35 U.S.C. § 119 to Japanese Patent Application No 2018-033374 filed on Feb. 27, 2018 in the Japan Patent Office, the entire disclosure of which is hereby incorporated by reference herein.

BACKGROUND

Technical Field

The present invention relates to an ink, an ink accommodating container, an image forming method, and an image forming device.

Description of the Related Art

Inkjet recording methods are advantageous in comparison with other recording methods in that the process is simple, full colorization is easy, and high definition images can be obtained by a device having a simple configuration. For this reason, inkjet recording is widely employed from home use to office use, commercial printing, and industrial printing. As the ink for use in inkjet recording, dye ink including water-soluble dyes are mainly used. Also, pigment ink including a non-water-soluble pigment has been developed to enhance water-resistance and light resistance.

For inkjet recording for use in office use, high density images are required using water-absorbing recording media, typically plain paper. In general, when images are printed on plain paper using the pigment ink, the pigment ink does not stay on the surface of the paper but permeates into the paper, so that the density of the pigment on the surface decreases, consequently lowering the image density. Image density increases as pigment density in the ink is increased. However, it also increases ink viscosity, thereby degrading discharging stability of the ink.

Also, for inkjet recording, mottle referred to as beading may appear on an image on a little-permeable medium such as coated paper or art paper or non-permeable film due to the pigment on the surface of such a recording medium.

SUMMARY

According to embodiments of the present disclosure, provided is an improved ink including water; a coloring material, and a polymer including a structure unit represented by the following Chemical formula 1 and a structure unit represented by the following Chemical formula 2 or the following Chemical formula 3, Chemical formula 1

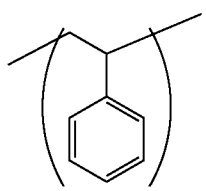

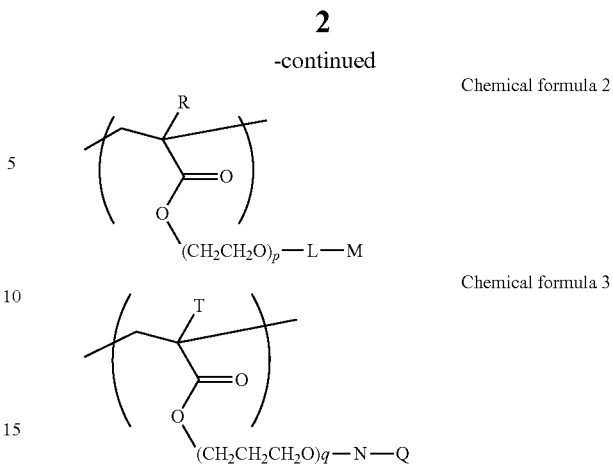

where R and T each, independently represent hydrogen atoms or methyl groups, L and N each, independently represent single bonds or carbonyl groups, M and Q each, independently represent naphthyl groups or biphenyl groups, p represents an integer of from 2 to 12, and q represents an integer of from 1 to 3.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

Figure 1:
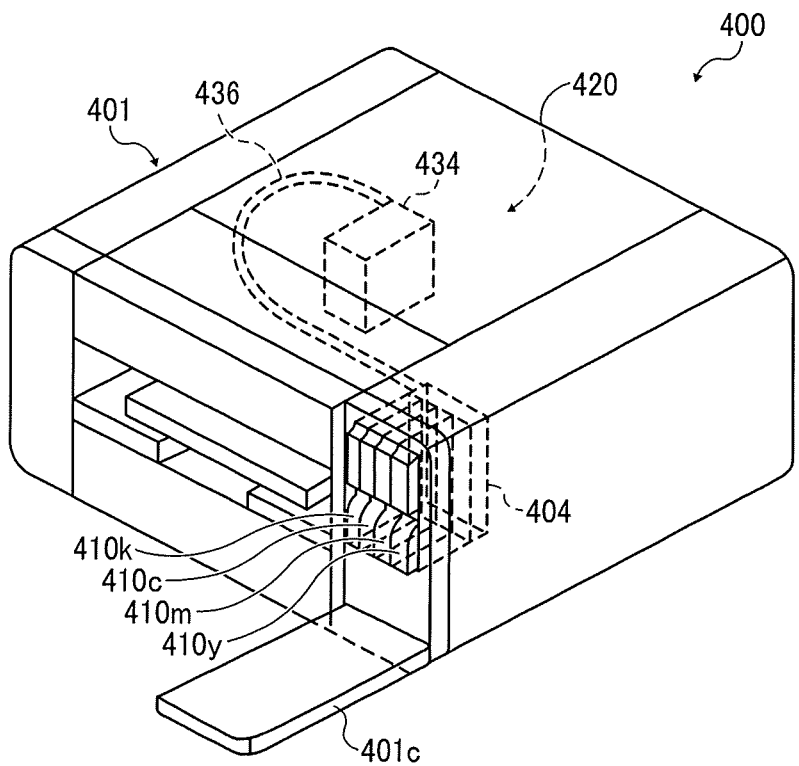
FIG. 1 is a diagram illustrating a perspective view of an example of an inkjet recording device.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc in the present disclosure represent the same meaning, unless otherwise specified.

A polymer having predetermined index values has been proposed in WO2007/053563 which produces a stable dispersion when taken into an inkjet ink composition as a colorant and becomes rapidly unstabilized in contact with paper.

In an attempt to solve the beading problem, an inkjet ink has been proposed in JP-4687110-B (JP-2006-188624-A) which contains at least water, an organic solvent, and a polymer, wherein the polymer contained in the inkjet ink demonstrates upper critical solution temperature (UCST) type separation in the range of from 0 to 100 degrees C. when the inkjet ink or water contained in the inkjet ink is partially evaporated.

Embodiments of the present disclosure are described in detail below, but the present disclosure is not limited thereto.

Ink

The ink of the present disclosure includes water, a coloring material, a polymer, and other optional components. The polymer includes the structure unit represented by the following Chemical formula 1 and the structure unit represented by the following Chemical formula 2 or the following Chemical formula 3,

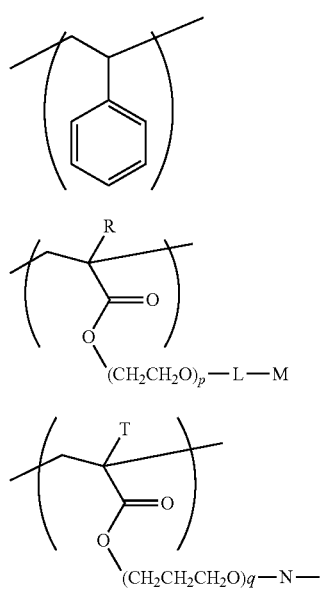

Chemical formula 1

Chemical formula 2

Chemical formula 3

In Chemical formula 2, p represents the length of ethylene oxide group and an integer of from 2 to 12.

In Chemical formula 2, L represents a single bond or a carbonyl group and M represents a biphenyl group or a naphthyl group.

In Chemical formula 3, q represents the length of the propylene oxide and an integer of from 1 to 3, N represents a single bond or a carbonyl group, and Q represents a biphenyl group or a naphthyl group.

Each component of the ink is described below. The polymer includes a copolymer. The copolymer is described below.

Copolymer

The structure unit represented by Chemical formula 2 in the copolymer includes a biphenyl group or a naphthyl group at a distal end thereof via an ethylene oxide group and has excellent pigment adsorption power due to π-π stacking with the pigment as the coloring material in the ink. Therefore, when the ink adheres to a recording medium, the biphenyl group or the naphthyl group in the structure unit of Chemical formula 2 in the copolymer comes into contact with the pigment on the recording medium. As a result, the pigment rapidly agglomerates. Similarly, the structure unit represented by Chemical formula 3 in the copolymer includes a biphenyl group or a naphthyl group at a distal end thereof via a propylene oxide group and has excellent pigment adsorption power due to π-π stacking with the pigment as the coloring material in the ink. Therefore, when the ink adheres to a recording medium, the biphenyl group or the naphthyl group in the structure unit of Chemical formula 3 in the copolymer comes into contact with the pigment on the recording medium. As a result, the pigment rapidly agglomerates.

The structural unit represented by Chemical formula 2 or Chemical formula 3 may include both structure units of Chemical formula 2 or Chemical formula 3.

However, when a copolymer includes only the structure unit represented by Chemical formula 2 or Chemical formula 3, the glass transition temperature Tg is low and only the pigment agglomerates, failing to enhance beading and image density. Therefore, in addition to the structure unit represented by Chemical formula 2 or Chemical formula 3, the inclusion of the structure unit represented by Chemical formula 1 having a high glass transition temperature (Tg) in the copolymer enhances image density on a recording medium and prevents beading (mottle) during high-speed printing, thereby capable of obtaining images having high definition and resolution. Notably, inclusion of a structure unit having a high glass transition temperature in the copolymer other than the structure unit represented by Chemical formula 1 has not been confirmed to enhance the image density.

The ethylene oxide group contained in the structure unit represented by Chemical formula 2 contributes to enhancement of image density. However, this group is hydrophilic, which may cause storage stability to deteriorate. Therefore, inclusion of the structure unit having a hydrophobic group represented by Chemical formula 1 and the structure unit represented by Chemical formula 2 in the copolymer secures storage stability of the ink. Propylene oxide group contained in the structure unit represented by Chemical formula 3 contributes to the improvement of the image density but is less hydrophilic than ethylene oxide group contained in the structure unit represented by Chemical formula 2, thereby securing storage stability of the ink.

The mass ratio of the structure unit represented by Chemical formula 1 and the structure unit represented by Chemical formula 2 and/or Chemical formula 3 (including the total) in the copolymer is preferably from 60:40 to 95:5, more preferably from 70:30 to 95:5, further preferably from 80:20 to 95:5, and particularly preferably from 90:10 to 95:5 in terms of the balance between the glass transition temperature Tg contributing to image density and ethylene oxide group or propylene oxide group contributing to storage stability. The number average molecular weight and the weight average molecular weight of the copolymer are respectively preferably from 2,000 to 25,000, and from 5,000 to 50,000.

Further, by introducing a structure unit represented by the following Chemical formula 4 into the copolymer including Chemical formula 1 and Chemical formula 2 or Chemical formula 3, the glass transition point Tg rises, so that a high image density can be obtained on a recording medium and beading (mottle) can be prevented even for high-speed printing, thereby obtaining an image with high resolution and definition.

Chemical formula 4

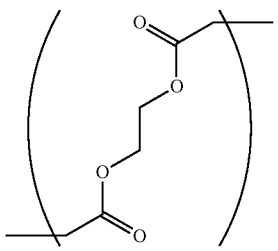

The copolymer may have a structure unit formed of a polymerizable monomer other than the structure unit represented by Chemical formula 4 in addition to the structure units represented by Chemical formula 1 and Chemical formula 2 or Chemical formula 3. Such other polymerizable monomers are not particularly limited and can be selected to a particular application. Examples thereof are polymerizable hydrophobic monomers, polymerizable hydrophilic monomers, and polymerizable surfactants.

Specific examples of the polymerizable hydrophobic monomers include, but are not limited to, unsaturated ethylene monomers having an aromatic ring such as α-methylstyrene, 4-t-butylstyrene, and 4-chloromethylstyrene; and unsaturated ethylene monomers having an alkyl group such as 1-heptene, 3,3-dimethyl-1-pentene, 4,4-dimethyl-1-pentene, 3-methyl-1-hexene, 4-methyl-1-hexene, 5-methyl-1-hexene, 1-octene, 3,3-dimethyl-1-hexene, 3,4-dimethyl-1-hexene, 4,4-dimethyl-1-hexene, 1-nonene, 3,5,5-trimethyl-1-hexene, 1-decene, 1-undecene, 1-dodecene, 1-tridecene, 1-tetradecene, 1-pentadecene, 1-hexadecene, 1-heptadecene, 1-octadecene, 1-nonadecene, 1-eicocene, and 1-docoscene.

These may be used alone or in combination of two or more thereof.

Specific examples of the polymerizable hydrophilic monomers include, but are not limited to, anionic unsaturated ethylene monomers such as (meth)acrylic acid or salts thereof, maleic acid or salts thereof, monomethyl maleate, itaconic acid, monomethyl itaconate, fumaric acid, 4-styrene sulfonic acid, and 2-acrylic amide-2-methyl propane sulfonic acid; and nonionic unsaturated ethylene monomers such as (meth)acrylic acid-2-hydroxyethyl, diethylene glycol mono(meth)acrylate, triethylene glycol mono(meth)acrylate, tetraethylene glycol mono(meth)acrylate, polyethylene glycol mono(meth)acrylate, (meth)acrylamide, N-methylol (meth)acrylamide, N-vinyl formamide, N-vinylacetoamide, N-vinylpyrolidone, acrylamide, N,N-dimethyl acrylamide, N-t-butyl acrylamide, N-octyl acrylamide, and N-t-octyl acrylamide.

The polymerizable hydrophobic monomer and the polymerizable hydrophilic monomer may be used singly or in combination of two or more. The polymerizable hydrophobic monomer and the polymerizable hydrophilic monomer can be used in a proportion of from 5 to 100 percent by mass to the total of each monomer constituting the structure unit represented by Chemical formula 1 and Chemical formula 2 or Chemical formula 3.

The polymerizable surfactant is an anionic or nonionic surfactant having at least one radically-polymerizable unsaturated double bond group in its molecule.

Examples of the anionic surfactant include, but are not limited to, hydrocarbon compounds having a sulfate group such as ammonium sulfate group ($-SO_3^-NH_4^+$) and an allyl group ($-CH_2-CH=CH_2$), hydrocarbon compounds having a sulfate group such as ammonium sulfate group ($-SO_3^-NH_4^+$) and a methacryl group [$-CO-C(CH_3)=CH_2$], or an aromatic hydrocarbon compounds having a sulfate group such as ammonium sulfate group ($-SO_3^-NH_4^+$) and 1-propenyl group ($-CH=CH_2CH_3$).

Specific examples of the product of the anionic surfactant available on the market include, but are not limited to, ELEMINOL JS-20 and RS-300 (both manufactured by Sanyo Chemical Industries, Ltd.) and Aqualon KH-10, Aqualon KH-1025, Aqualon KH-05, Aqualon HS-10, Aqualon HS-1025, Aqualon BC-0515, Aqualon BC-10, Aqualon BC-1025, Aqualon BC-20, and Aqualon BC-2020 (all manufactured by DKS Co. Ltd.).

Examples of the nonionic surfactant include, but are not limited to, hydrocarbon compounds or aromatic hydrocarbon compounds having 1-propenyl group ($-CH=CH_2CH_3$) and polyoxyethylene group [$-(C_2H_4O)_n-H$].

Specific examples of the product of the nonionic surfactant available on the market include, but are not limited to, Aqualon RN-20, Aqualon RN-2025, Aqualon RN-30, and Aqualon RN-50 (all manufactured by DKS Co. Ltd.) and LATEMUL PD-104, LATEMUL PD-420, LATEMUL PD-430, and LATEMUL PD-450 (all manufactured by Kao Corporation).

As the polymerizable surfactant, the simple compound or a mixture of two or more kinds accounts for 0.1 to 10 percent by mass of the total of each monomer to form the structure unit represented by Chemical formula 1 and Chemical formula 2 or Chemical formula 3.

The radical polymerization initiator for use in copolymerization is suitably selected to suit to a particular application.

Specific examples include, but are not limited to, peroxy ketal, hydroperoxide, dialkyl peroxide, diacylperoxide, peroxydicarbonate, peroxyester, cyano-based azobisisobutylonitrile, azobis(2-methylbutylonitrile), azobis(2,2'-isovaleronitrile), and non-cyano-based dimethyl-2,2'-azobis isobutylate. Of these, in terms of easiness of molecular mass control and low dissolution temperature, organic peroxides and azo-based compounds are preferable and azo-based compounds are more preferable. In addition, the proportion of the radical polymerization initiator is not particularly limited and can be suitably selected to suit to a particular application. The proportion is preferably from 1 to 10 percent by mass based on the total amount of the polymerizable monomer for use in copolymerization.

To control the molecular weight of the copolymer, an appropriate amount of a chain transfer agent may be optionally added.

Specific examples of the chain transfer agents include, but are not limited to, mercapto acetate, mercapto propionate, 2-propane thiol, 2-meracapto ethanol, thiophenol, dodecyl mercaptane, 1-dodecane thiol, and thioglycerol.

The polymerization temperature is not particularly limited and can be suitably selected to a particular application. The polymerization temperature is preferably from 50 to 150 degrees C. and more preferably from 60 to 100 degrees C. The polymerization time is not particularly limited and can be suitably selected to suit to a particular application. It is preferably from 3 to 48 hours.

The ink may be an emulsion in which the copolymer is a particle and water is a dispersion medium. The particle diameter of the copolymer particles or emulsion is preferably from 10 to 1,000 nm and more preferably from 50 to 200 nm in terms of prevention of beading, image density, and image fixability.

The proportion of the copolymer in the ink is preferably from 0.5 to 12 percent by mass and more preferably from 2 to 6 percent by mass in order to obtain a higher image density.

In addition to the copolymer, the ink may contain urethane resins, polyester resins, acrylic-based resins, vinyl acetate-based resins, styrene-based resins, butadiene-based resins, styrene-butadiene-based resins, vinyl chloride-based resins, acrylic styrene-based resins, and acrylic silicone-based resins.

Coloring Material

The coloring material for use in the ink of the present disclosure can be pigments and dyes. With regard to the adsorption power of the polymer to the coloring material, pigments are superior to dyes. Moreover, pigments are preferable in terms of water resistance and light resistance. These can be used alone or in combination.

As the pigments, for example, black pigments, yellow pigments, magenta pigments, cyan pigments, white pigments, green pigments, orange pigments, gloss pigments of gold, silver, etc., and metallic pigments can be used.

As the inorganic pigments, in addition to titanium oxide, iron oxide, calcium oxide, barium sulfate, aluminum hydroxide, barium yellow, cadmium red, and chrome yellow, carbon black manufactured by known methods such as contact methods, furnace methods, and thermal methods can be used.

As the organic pigments, it is possible to use azo pigments, polycyclic pigments (phthalocyanine pigments, perylene pigments, perinone pigments, anthraquinone pigments, quinacridone pigments, dioxazine pigments, indigo pigments, thioindigo pigments, isoindolinone pigments, and quinophthal one pigments, etc.), dye chelates (basic dye type chelates, acid dye type chelates, etc.), nitro pigments, nitroso pigments, and aniline black can be used. Of these pigments, pigments having good affinity with water are preferable. Also, resin hollow particles and inorganic hollow particles may be used as the pigment.

Specific examples of the black pigment include, but are not limited to, carbon black (C.I. Pigment Black 7) such as furnace black, lamp black, acetylene black, and channel black, metals such as copper, iron (C.I. Pigment Black 11), and titanium oxides, and organic pigments such as aniline black (C.I. Pigment Black 1).

Specific examples of the pigments for color include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, and 213; C.I. Pigment Orange 5, 13, 16, 17, 36, 43, and 51; C.I. Pigment Red 1, 2, 3, 5, 17, 22, 23, 31, 38, 48:2, 48:2 {Permanent Red 2B(Ca)}, 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 184, 185, 190, 193, 202, 207, 208, 209, 213, 219, 224, 254, and 264; C.I. Pigment Violet 1 (Rhodamine Lake), 3, 5:1, 16, 19, 23, and 38; C.I. Pigment Blue 1, 2, 15 (Phthalocyanine Blue), 15:1, 15:2, 15:3, 15:4, (Phthalocyanine Blue), 16, 17:1, 56, 60, and 63; C.I. Pigment Green 1, 4, 7, 8, 10, 17, 18, and 36.

The dye is not particularly limited. Acid dyes, direct dyes, reactive dyes, and basic dyes can be used. These can be used alone or in combination.

Specific examples of the dye include, but are not limited to, C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C.I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35.

The proportion of the coloring material in the ink is preferably from 0.1 to 15 percent by mass and more preferably from 1 to 10 percent by mass based on the total amount of the ink in terms of enhancement of image density, fixability, and discharging stability.

To disperse a pigment in ink, for example, a hydrophilic functional group is introduced into the pigment to prepare a self-dispersible pigment, the surface of the pigment is coated with a resin, or a dispersant is used.

To obtain the self-dispersible pigment having a hydrophilic functional group introduced into a pigment, a functional group such as a sulfone group or a carboxyl group is added to a pigment (e.g., carbon) to be made dispersible in water.

To obtain the pigment whose surface is covered with a resin, a pigment is enclosed in a microcapsule to be made dispersible in water. This can be referred to as a resin-coated pigment. In this case, all the pigments to be added to ink are not necessarily entirely coated with a resin. Pigments partially or entirely uncovered with a resin are allowed to be dispersed in the ink unless such pigments have an adverse impact.

Examples of the dispersant to disperse the pigment include known low molecular type dispersants and polymer type dispersants, represented by surfactants. The dispersant is selected depending on the pigment. For example, it is possible to use an anionic surfactant, a cationic surfactant, a nonionic surfactant, and an amphoteric surfactant. Also, a nonionic surfactant (RT-100, manufactured by TAKEMOTO OIL & FAT CO., LTD.) and a formalin condensate of naphthalene sodium sulfonate are suitable as the dispersant. Those can be used alone or in combination.

Pigment Dispersion

To obtain the ink, for example, a coloring material is mixed with material such as water or an organic solvent. Alternatively, a pigment is mixed with water or a dispersant to obtain a pigment dispersion, which is thereafter mixed with material such as water or an organic solvent.

The pigment dispersion can be obtained by dispersing a pigment, a pigment dispersant, and other optional components in water and adjusting the particle size. The particle diameter of the pigment in the pigment dispersion has no particular limit. For example, the maximum frequency is preferably from 20 to 500 nm and more preferably from 20 to 150 nm in the maximum number conversion to improve dispersion stability of the pigment and ameliorate discharging stability and the image quality such as image density. The particle diameter of a pigment can be measured using a particle size analyzer (Nanotrac Wave-UT151, manufactured by MicrotracBEL Corp).

In addition, the proportion of the pigment in the pigment dispersion is not particularly limited and can be suitably selected to suit a particular application. In terms of improving discharging stability and increasing image density, the proportion is preferably from 0.1 to 50 percent by mass and more preferably from 0.1 to 30 percent by mass. It is preferable that the pigment dispersion be filtered with a filter, a centrifuge, etc. to remove coarse particles followed by degassing.

The ink of the present disclosure preferably includes a water-soluble organic solvent in order to enhance permeation of the ink into plain paper, coated paper, etc., thereby further reducing the occurrence of beading and preventing the ink from drying taking advantage of moisturizing effect.

The water-soluble organic solvent has no particular limit.

Specific examples include, but are not limited to, polyols such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butane diol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butane triol, 1,2,3-butanetriol, 2,2,4-trimethyl-1,3-pentanediol, and petriol; polyol alkylethers such as ethylene glycol monoethylether, ethylene glycol monobutylether, diethylene glycol monomethylether, diethylene glycol monoethylether, diethylene glycol monobutylether, tetraethylene glycol monomethylether, and propylene glycol monoethylether; polyol arylethers such as ethylene glycol monophenylether and ethylene glycol monobenzylether; nitrogen-containing heterocyclic compounds such as 2-pyrolidone, N-methyl-2-pyrolidone, N-hydroxyethyl-2-pyrolidone, 1,3-dimethyl-2-imidazolidinone, ε-caprolactam, and α-butyrolactone; amides such as formamide, N-methylformamide, N,N-dimethylformamide, 3-methoxy-N,N-dimethyl propionamide, and 3-butoxy-N,N-dimethyl propionamide; amines such as monoethanolamine, diethanolamine, and triethylamine; sulfur-containing compounds such as dimethyl sulfoxide, sulfolane, and thiodiethanol; propylene carbonate, and ethylene carbonate. These can be used alone or in combination.

Of these, in terms of prevention of curling of plain paper, preferred are 3-ethyl-3-hydroxymethyloxetane, isopropylidene glycerol, N,N-dimethyl-β-methoxy propionamide, and N,N-dimethyl-β-buthoxy propionamide.

Of these, diethylene glycol, triethylene glycol, 1,3-butanediol, 2,2,4-trimethyl-1,3-pentanediol, and glycerin are excellent to prevent discharge failure ascribable to evaporation of water. To serve as a humectant and also impart a good drying property, it is preferable to use an organic solvent having a boiling point of 250 degrees C. or lower.

Specific examples of the other water soluble organic solvents include, but are not limited to, aliphatic diols such as 2-ethyl-2-methyl-1,3-propane diol, 2,2-diethyl-1,3-propane diol, 2-methyl-2-propyl-1,3-propane diol, 3,3-dimethyl-1,2-butane diol, 2,4-dimethyl-2,4-pentane diol, 2,5-dimethyl-2,5-hexane diol, and 5-hexene-1,2-diol.

In addition, a water-soluble organic solvent that can be used in combination with the above-mentioned water soluble organic solvent can be appropriately selected to suit to a particular application from alkyl or aryl ethers of polyhydric alcohols such as diethylene glycol monobutyl ether, propyleneglycol monobutyl ether, ethylene glycol monophenyl ether, diethylene glycol monophenyl ether, ethylene glycol monoallyl ether, and tetraethylene glycol chlorophenyl ether and a lower alcohol such as ethanol.

Additive

The ink may further optionally contain additives such as a surfactant, a defoaming agent, a preservative and fungicide, a corrosion inhibitor, and a pH regulator.

Surfactant

As the surfactant, it is possible to use any of a silicone-based surfactant, a fluorochemical surfactant, an amphoteric surfactant, a nonionic surfactant, and an anionic surfactant.

The silicone-based surfactant is not particularly limited and can be suitably selected to suit to a particular application. It is preferable to select silicone-based surfactants undecomposable even at a high pH, examples of which include side chain-modified polydimethylsiloxane, both distal end-modified polydimethylsiloxane, one distal end-modified polydimethyl siloxane, and side chain-both distal end-modified polydimethylsiloxane. Of these, as the modification group, it is preferable to select a polyoxyethylene group or polyoxyethylene polyoxypropylene group because these demonstrate good properties as aqueous surfactants. It is also possible to use a polyether-modified silicone-based surfactant as the silicone-based surfactant. A specific example is a compound in which a polyalkylene oxide structure is introduced into the side chain of the Si site of dimethyl siloxane.

Specific examples of the fluorochemical surfactant include, but are not limited to, perfluoroalkyl sulfonic acid compounds, perfluoroalkyl carboxylic acid compounds, perfluoroalkyl phosphoric acid ester compounds, adducts of perfluoroalkyl ethylene oxide, and polyoxyalkylene ether polymer compounds having a perfluoroalkyl ether group in its side chain in terms of demonstrating low foaming property. Specific examples of the perfluoroalkyl sulfonic acid compounds include, but are not limited to, a perfluoroalkyl sulfonic acid and a salt of perfluoroalkyl sulfonic acid.

Specific examples of the perfluoroalkyl carboxylic acid compounds include, but are not limited to, a perfluoroalkyl carboxylic acid and a salt of perfluoroalkyl carboxylic acid.

Specific examples of the polyoxyalkylene ether polymer compounds having a perfluoroalkyl ether group in its side chain include, but are not limited to, sulfuric acid ester salts of polyoxyalkylene ether polymer having a perfluoroalkyl ether group in its side chain, and salts of polyoxyalkylene ether polymers having a perfluoroalkyl ether group in its side chain. Specific examples of the counter ion of the salt of these fluorochemical surfactants include, but are not limited to, Li, Na, K, $NH_4$, $NH_3CH_2CH_2OH$, $NH_2(CH_2CH_2OH)_2$, and $NH(CH_2CH_2OH)_3$.

Specific examples of the amphoteric surfactants include, but are not limited to, lauryl aminopropionic acid salts, lauryl dimethyl betaine, stearyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides.

Specific examples of the anionic surfactants include, but are not limited to, polyoxyethylene alkyl ether acetates, dodecyl benzene sulfonates, laurates, and polyoxyethylene alkyl ether sulfates. These can be used alone or in combination.

The silicone-based surfactants are not particularly limited.

Specific examples include, but are not limited to, side chain-modified polydimethyl siloxane, both distal end-modified polydimethyl siloxane, one distal end-modified polydimethyl siloxane, and side chain both distal-end-modified polydimethyl siloxane. Of these, polyether-modified silicon-based surfactants having a polyoxyethylene group or polyoxyethylene polyoxypropylene group as the modification group are particularly preferable because these demonstrate good properties as aqueous surfactants.

Any product of the fluorine-containing surfactants available on the market can be used. Products available on the market can be obtained from BYK-Chemie GmbH, Shin-Etsu Chemical Co., Ltd., Dow Corning Toray Co., Ltd., etc., NIHON EMULSION Co., Ltd., Kyoeisha Chemical Co., Ltd., etc. The polyether-modified silicon-based surfactant is not particularly limited and can be suitably selected to suit to a particular application. For example, a compound is usable in which the polyalkylene oxide structure represented by Chemical formula S-1 is introduced into the side chain of the Si site of dimethyl polysiloxane.

Chemical formula S-1

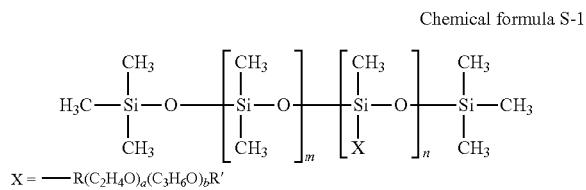

X = ——R(C$_2$H$_4$O)$_a$(C$_3$H$_6$O)$_b$R'

In Chemical formula S-1 illustrated above, m, n, a, and b each, independently represent integers. R and R' each, independently represent alkyl groups and alkylene groups.

Specific examples of the polyether-modified silicone-based surfactants include, but are not limited to, KF-618, KF-642, and KF-643 (all manufactured by Shin-Etsu Chemical Co., Ltd.), EMALEX-SS-5602 and SS-1906EX (both manufactured by NIHON EMULSION Co., Ltd.), FZ-2105, FZ-2118, FZ-2154, FZ-2161, FZ-2162, FZ-2163, and FZ-2164 (all manufactured by Dow Corning Toray Co., Ltd.), BYK-33 and BYK-387 (both manufactured by BYK-Chemie GmbH), and TSF4440, TSF4452, and TSF4453 (all manufactured by Momentive Performance Materials Inc.).

The fluorochemical surfactant is preferably a fluorine-substituted compound having 2 to 16 carbon atoms and more preferably a fluorine-substituted compound having 4 to 16 carbon atoms.

Specific examples of the fluorochemical surfactants include, but are not limited to, perfluoroalkyl phosphoric acid ester compounds, adducts of perfluoroalkyl ethylene oxide, and polyoxyalkylene ether polymer compounds having a perfluoroalkyl ether group in its side chain. Of these, polyoxyalkylene ether polymer compounds having a perfluoroalkyl ether group in its side chain are preferable because these do not easily foam and the fluorochemical surfactant represented by the following Chemical formula F-1 or Chemical formula F-2 is preferable.

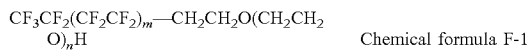

CF$_3$CF$_2$(CF$_2$CF$_2$)$_m$—CH$_2$CH$_2$O(CH$_2$CH$_2$O)$_n$H     Chemical formula F-1

In the compound represented by Chemical formula F-1, m is preferably 0 or an integer of from 1 to 10 and n is preferably 0 or an integer of from 1 to 40.

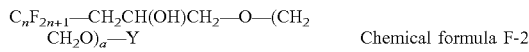

C$_n$F$_{2n+1}$—CH$_2$CH(OH)CH$_2$—O—(CH$_2$CH$_2$O)$_a$—Y     Chemical formula F-2

In the compound represented by the Chemical formula F-2, Y represents H or C$_n$F$_{2n+1}$, where n represents an integer of from 1 to 6, or CH$_2$CH(OH)CH$_2$—C$_n$F$_{2n+1}$, where n represents an integer of from 4 to 6, or C$_p$H$_{2p+1}$, where p is an integer of from 1 to 19, "a" represents an integer of from 4 to 14.

As the fluorochemical surfactant, products available on the market may be used. Specific examples of the products available on the market include, but are not limited to, SURFLON S-111, S-112, S-113, S-121, S-131, S-132, S-141, and S-145 (all manufactured by ASAHI GLASS CO., LTD.); FLUORAD FC-93, FC-95, FC-98, FC-129, FC-135, FC-170C, FC-430, and FC-431 (all manufactured by SUMITOMO 3M LIMITED); MEGAFACE F-470, F-1405, and F-474 (all manufactured by DIC CORPORATION); ZONYL TBS, FSP, FSA, FSN-100, FSN, FSO-100, FSO, FS-300, and UR (all manufactured by E. I. du Pont de Nemours and Company); FT-110, FT250, FT-251, FT-400S, FT-150, and FT-400SW (all manufactured by NEOS COMPANY LIMITED); POLYFOX PF-136A, PF-156A, PF-151N, PF-154, and PF-159 (manufactured by OMNOVA SOLUTIONS INC.), and UNIDYNE DSN-403N (manufactured by DAIKIN INDUSTRIES, LTD.). Of these, FS-300 (manufactured by E. I. du Pont de Nemours and Company), FT-110, FT-250, FT-251, FT-400S, FT-150, and FT-400SW (manufactured by NEOS COMPANY LIMITED), PolyFox PF-151N (manufactured by OMNOVA SOLUTIONS INC.), and UNIDYNE DSN-403N (manufactured by DAIKIN INDUSTRIES, LTD.) are particularly preferable in terms of good printing quality, coloring in particular, and improvement on permeation to paper, wettability, and uniform dying property.

The proportion of the surfactant in ink is not particularly limited and be suitably selected to suit to a particular application. For example, it is preferably from 0.001 to 5 percent by mass and more preferably from 0.05 to 5 percent by mass in terms of excellent wettability and discharging stability and improvement on image quality.

Defoaming Agent

The defoaming agent is not particularly limited. For example, silicon-based defoaming agents, polyether-based defoaming agents, and aliphatic acid ester-based defoaming agents are usable. These can be used alone or in combination. Of these, silicone-based defoaming agents are preferable in terms of the effect of foam breaking.

Preservatives and Fungicides

The preservatives and fungicides are not particularly limited. A specific example is 1,2-benzisothiazoline-3-one.

Corrosion Inhibitor

The corrosion inhibitor is not particularly limited. Specific examples include, but are not limited to, acid sulfites and sodium thiosulfates.

pH Regulator

The pH regulator is not particularly limited as long as it can control pH to not lower than 7. Specific examples include, but are not limited to, amines such as diethanol amine and triethanol amine.

Properties of the ink are not particularly limited and can be suitably selected to suit to a particular application. For example, viscosity, surface tension, pH, etc., are preferable in the following ranges. Viscosity of the ink at 25 degrees C. is preferably from 5 to 30 mPa·s and more preferably from 5 to 25 mPa·s to improve print density and text quality and obtain good dischargeability. Viscosity can be measured by, for example, a rotatory viscometer (RE-80L, manufactured by TOKI SANGYO CO., LTD.). The measuring conditions are as follows:

Standard cone rotor (1° 34'×R24)
Sample liquid amount: 1.2 mL
Number of rotations: 50 rotations per minute (rpm)
25 degrees C.
Measuring time: three minutes The surface tension of the ink is preferably 35 mN/m or less and more preferably 32 mN/m or less at 25 degrees C. in terms that the ink is preferably and suitably leveled on a recording medium and the drying time of the ink is shortened. pH of the ink is preferably from 7 to 12 and more preferably from 8 to 11 in terms of prevention of corrosion of metal material in contact with liquid.

Pre-Processing Fluid

The pre-processing fluid includes a flocculant, an organic solvent, water, and optional materials such as a surfactant, a defoaming agent, a pH regulator, a preservatives and fungicides, and a corrosion inhibitor.

The organic solvent, the surfactant, the defoaming agent, the pH regulator, the preservatives and fungicides, and the corrosion inhibitor can be the same material as those for use in the ink. Also, other material for use in known processing fluid can be used.

The type of the flocculant is not particularly limited. For example, water-soluble cationic polymers, acids, and multivalent metal salts are suitable.

Post-Processing Fluid

The post-processing fluid has no particular limit. It is preferable that the post-processing fluid can form a transparent layer. Material such as organic solvents, water, resins, surfactants, defoaming agents, pH regulators, preservatives and fungicides, corrosion inhibitors, etc. is suitably selected based on a necessity basis and mixed to obtain the post-processing fluid. The post-processing fluid can be applied to the entire recording area formed on a recording medium or only the area on which an ink image is formed.

Recording Medium

The recording medium for use in recording is not particularly limited.

Specific examples include, but are not limited to, plain paper, gloss paper, special paper, cloth, film, transparent sheets, and printing paper for general purpose.

Recording Medium

The recording medium is not particularly limited. Plain paper, gloss paper, special paper, cloth, etc. are usable. Also, good images can be formed on a non-permeable substrate.

The non-permeable substrate has a surface with low moisture permeability and low absorbency and includes a material having myriad of hollow spaces inside but not open to the outside. To be more quantitative, the substrate has a water-absorption amount of 10 mL/m$^2$ or less between the start of the contact and 30 msec$^{1/2}$ later according to Bristow method.

For example, plastic films such as vinyl chloride resin film, polyethylene terephthalate (PET) film, polypropylene film, polyethylene film, and polycarbonate film are suitably used as the non-permeable substrate.

The recording media are not limited to articles used as typical recording media. It is suitable to use building materials such as wall paper, floor material, and tiles, cloth for apparel such as T-shirts, textile, and leather as the recording medium. In addition, the configuration of the paths through which the recording medium is conveyed can be adjusted to use ceramics, glass, metal, etc.

Recorded Matter

The ink recorded matter of the present disclosure includes a recording medium and an image formed on the recording medium with the ink of the present disclosure.

By recording according to an inkjet recording device and an inkjet recording method, the recorded matter is obtained.

Recording Device and Recording Method

The ink of the present disclosure can be suitably applied to various recording devices employing an inkjet recording method, such as printers, facsimile machines, photocopiers, multifunction peripherals (serving as a printer, a facsimile machine, and a photocopier), and solid freeform fabrication devices (3D printers, additive manufacturing devices).

In the present disclosure, the recording device and the recording method respectively represent a device capable of discharging ink, various processing fluids, etc. to a recording medium and a method of recording utilizing the device. The recording medium means an article to which ink or various processing fluids can be attached temporarily or permanently.

The recording device may further optionally include a device relating to feeding, conveying, and ejecting a recording medium and other devices referred to as a pre-processing device, a post-processing device, etc. in addition to the head portion to discharge the ink.

The recording device and the recording method may further optionally include a heating device (heater) for use in the heating process and a drying device (drier) for use in the drying process. For example, the heating device and the drying device heat and dry the print surface and the opposite surface of a recording medium. The heating device and the drying device are not particularly limited. For example, a fan heater and an infra-red heater can be used. Heating and drying can be conducted before, in the middle of, or after printing.

In addition, the recording device and the recording method are not limited to those producing meaningful visible images such as texts and figures with ink. For example, the recording method and the recording device capable of producing patterns like geometric design and 3D images are included.

In addition, the recording device includes both a serial type device in which the discharging head is allowed to move and a line type device in which the liquid discharging head is not moved, unless otherwise specified.

Furthermore, in addition to the desktop type, this recording device includes a device capable of printing images on a wide recording medium such as AO and a continuous printer capable of using continuous paper rolled up in a roll-like form as a recording medium.

Figure 2:
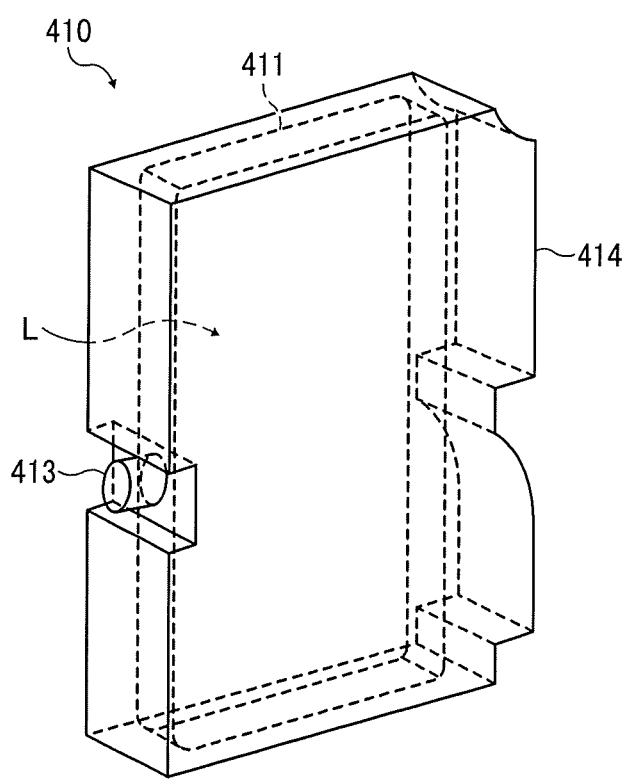
FIG. 2 is a diagram illustrating a perspective view of the main tank of the recording device illustrated in FIG. 1.

The recording device is described using an example with reference to FIG. 1 and FIG. 2. FIG. 1 is a diagram illustrating a perspective view of the recording device. FIG. 2 is a diagram illustrating a perspective view of the main tank. An image forming device 400 as an embodiment of the recording device is a serial type image forming device. A mechanical unit 420 is disposed in an exterior 401 of the image forming device 400.

Each ink accommodating unit (ink container) 411 of each main tank 410 (410$k$, 410$c$, 410$m$, and 410$y$) for each color of black (K), cyan (C), magenta (M), and yellow (Y) is made of a packaging member such as aluminum laminate film. The ink accommodating unit 411 is housed in, for example, a plastic container housing unit 414. As a result, the main tank 410 is used as an ink cartridge of each color.

A cartridge holder 404 is disposed on the rear side of the opening appearing when a cover 401$c$ is opened. The main tank 410 is detachably attached to the cartridge holder 404. This enables each ink outlet 413 of the main tank 410 to communicate with a discharging head 434 for each color via a supplying tube 436 for each color so as to discharge the ink from a discharging head 434 to a recording medium.

The main tank (ink accommodating container) 410 accommodates the ink and includes other optional suitably-selected members. There is no specific limit to the container. The form, the structure, the size, and the material thereof can be suitably determined to suit to a particular application. For example, a container including at least an ink bag formed of aluminum laminate film, a resin film, etc. is suitable.

The ink accommodating unit 411 is filled with ink supplied through an ink inlet. Subsequent to degassing, the ink inlet is closed by fusion to form the main tank 410. When in use, an ink outlet 413 made of a rubber member is pierced with the needle installed onto an inkjet recording device to supply the ink into the device. The ink accommodating unit 411 is made of a packaging material such as aluminum laminate film having no air permeability. The ink containing unit 411 is typically housed in a accommodating unit housing 414 made of plastic and detachably attachable to various inkjet recording devices.

This recording device may include not only a portion to discharge ink but also devices referred to as a pre-processing device, a post-processing device, etc.

As an example of the pre-processing device and the post-processing device, as in the case of the ink such as black (K), cyan (C), magenta (M), and yellow (Y), the pre-processing device and the post-processing device may further include a liquid accommodating unit including a pre-processing fluid or a post-processing fluid and a liquid discharging head to discharge the pre-processing fluid or the post-processing fluid according to an inkjet printing method.

As another example of the pre-processing device and the post-processing device, it is suitable to dispose a pre-processing device and a post-processing device which do not employ the inkjet printing method but a blade coating method, a roll coating method, or a spray coating method.

Notably, the ink is applicable not only to the inkjet print method but can be widely applied in other methods. Specific examples of such methods other than the inkjet recording method include, but are not limited to, blade coating methods, gravure coating methods, bar coating methods, roll coating methods, dip coating methods, curtain coating methods, slide coating methods, die coating methods, and spray coating methods.

The usage of the ink of the present disclosure is not particularly limited and can be suitably selected to suit to a particular application. For example, the ink can be used for printed matter, a paint, a coating material, and foundation. The ink can be used to form two-dimensional texts and images and furthermore a three-dimensional solid object (solid freeform fabrication object) as a material for 3D modeling.

The solid fabrication device to fabricate a solid fabrication object can be any known device with no particular limit. For example, the device includes a container, a supplying device, and a discharging device, a drier, etc. of ink. The solid fabrication object includes an object manufactured by repeated ink coating. In addition, the solid fabrication object includes a molded processed product manufactured by processing a structure having a substrate such as a recording medium to which the ink is applied. The molded processed product is manufactured from recorded matter or a structure having a sheet-like form, film-like form, etc. by, for example, heating drawing or punching. The molded processed product is suitably used for articles which are molded after surface-decorating. Examples are gauges or operation panels of vehicles, office machines, electric and electronic devices, cameras, etc.

Image forming, recording, printing, print, etc. in the present disclosure represent the same meaning.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, embodiments of the present disclosure are described in detail with reference to Examples but are not limited thereto. In Examples, "parts" and "percent" are "parts by mass" and "percent by mass" unless otherwise specified. The molecular weights of the copolymers obtained in Examples and Comparative Examples were measured in the following manner.

Measuring of Molecular Weight of Copolymer

The molecular weight was measure by Gel Permeation Chromatography (GPC) under the following conditions:

Instrument: HLC-8320 GPC (manufactured by Tosoh Corporation)

Column: TSK G2000 HXL and G4000 HXL (manufactured by TOSOH CORPORATION)

Temperature: 40 degrees C.

Solvent: tetrahydrofuran (THF)

Flow rate: 0.6 mL/min.

1 mL of a copolymer having a concentration of 0.5 percent by mass was infused into the column and using the molecular weight calibration curve obtained based on a simple dispersion polystyrene standard sample from the molecular weight distribution of the copolymer measured under the conditions specified above, the number average molecular weight Mn and the weight average molecular weight Mw of the copolymer were calculated.

Synthesis Example 1: Synthesis of Copolymer 1

After 20.0 g of biphenyl-3-carboxylic acid (manufactured by Tokyo Chemical Industry Co., Ltd.) was gradually added to 33.0 g of diethylene glycol (manufactured by Tokyo Chemical Industry Co., Ltd.) which had been heated to 80 degrees C., 1.0 g of sulfuric acid was added and the mixture was heated to 115 degrees C. and stirred for 4 hours.

Subsequent to cooling down to 40 degrees C., an aqueous solution in which 8.5 g of sodium hydrogen carbonate was dissolved in 50 ml of water was added and the resultant was stirred for 15 minutes. 50 mL of toluene was added to the thus-obtained mixture to isolate the organic phase and thereafter toluene was distilled away. The residual was refined by silica gel column chromatography with a solvent mixture of methylene chloride and methanol with a volume ratio of 98:2 serving as an eluent to obtain 22.5 g of Intermediate 1 illustrated below.

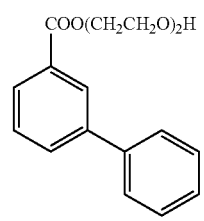

Intermediate 1

5.23 g of methacrylic acid chloride (manufactured by Tokyo Chemical Industry Co., Ltd.), 14.3 g of Intermediate 1, and 5.32 g of triethylamine (manufactured by Tokyo Chemical Industry Co., Ltd.) were dissolved in 50 mL of methylene chloride and stirred at room temperature for 4 hours. The thus-obtained reaction solution was rinsed with water and thereafter the organic phase was isolated followed by drying with magnesium sulfate and the solvent was distilled away. The residual was refined by silica gel column chromatography with a solvent mixture of methylene chloride and hexane with a volume ratio of 8:2 serving as an eluent to obtain 13.5 g of methacrylic acid derivative 1 illustrated below.

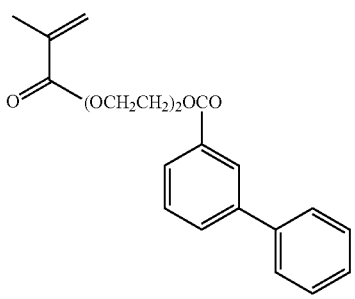

Methacrylic acid derivative 1

Next, 4.00 g of methacrylic acid derivative 1 was dissolved in 6.00 g of styrene (manufactured by Tokyo Chemical Industry Co., Ltd.), and 12.0 g of deionized water, 0.20 g of polyoxyethylene nonyl propenyl phenyl ether ammonium sulfate (Aqualon BC-10, manufactured by DKS Co. Ltd.), and 0.05 g of ammonium persulfate were added to form a pre-emulsion with a homomixer. Thereafter, 0.20 g of Aqualon BC-10 was added to 10.0 g of deionized water which had been heated to 80 degrees C. in argon atmosphere. Thereafter, 10 percent of the pre-emulsion was added to cause initial polymerization for 30 minutes. Thereafter, the rest of the pre-emulsion was dripped in two hours to cause polymerization followed by further polymerization at 80 degrees C. for two hours. Subsequent to cooling down, the resultant was filtered and neutralized with ammonium water to obtain Copolymer 1 (weight average molecular weight (Mw) of 48,000, number average molecular weight (Mn) of 24,800) having a solid portion concentration of 30 percent by mass.

Synthesis Example 2: Synthesis of Copolymer 2

20.0 g of biphenyl-3-carboxylic acid was gradually added to 90.0 g of hexaethylene glycol which had been heated to 80 degrees C. Thereafter, 1.0 g of sulfuric acid was added and the thus-obtained mixture was heated to 115 degrees C. and stirred for 4 hours. Subsequent to cooling down to 40 degrees C., an aqueous solution in which 8.5 g of sodium hydrogen carbonate was dissolved in 50 mL of water was added and the resultant was stirred for 15 minutes. 50 mL of toluene was added to the thus-obtained mixture to isolate the organic phase and thereafter toluene was distilled away. The residual was refined by silica gel column chromatography with a solvent mixture of methylene chloride and methanol with a volume ratio of 98:2 serving as an eluent to obtain 40.1 g of Intermediate 2 illustrated below.

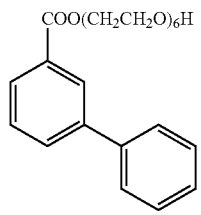

Intermediate 2

5.23 g of methacrylic acid chloride (manufactured by Tokyo Chemical Industry Co., Ltd.), 23.1 g of Intermediate 2, and 5.32 g of triethylamine (manufactured by Tokyo Chemical Industry Co., Ltd.) were dissolved in 50 mL of methylene chloride and stirred at room temperature for 4 hours. The thus-obtained reaction solution was rinsed with water and thereafter the organic phase was isolated followed by drying with magnesium sulfate and the solvent was distilled away. The residual was refined by silica gel column chromatography with a solvent mixture of methylene chloride and hexane with a volume ratio of 8:2 serving as an eluent to obtain 22.2 g of methacrylic acid derivative 2 illustrated below.

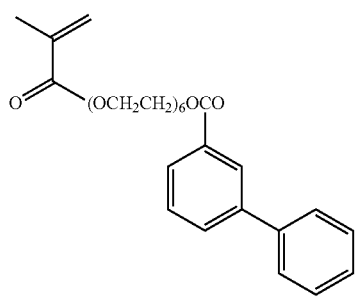

Methacrylic acid derivative 2

Next, Copolymer 2 (weight average molecular weight (Mw) of 49,100, number average molecular weight (Mn) of 25,000) having a solid portion concentration of 30 percent was obtained in the same manner as in Synthesis Example 1 except that the methacrylic acid derivative 2 was used instead of the methacrylic acid derivative 1.

Synthesis Example 3: Synthesis of Copolymer 3

20.0 g of biphenyl-3-carboxylic acid was gradually added to 168.0 g of dodecaethylene glycol which had been heated to 80 degrees C. Thereafter, 1.0 g of sulfuric acid was added and the thus-obtained mixture was heated to 115 degrees C. and stirred for 4 hours. Subsequent to cooling down to 40 degrees C., an aqueous solution in which 8.5 g of sodium hydrogen carbonate was dissolved in 70 mL of water was added and the resultant was stirred for 15 minutes. 50 mL of toluene was added to the thus-obtained mixture to isolate the organic phase and thereafter toluene was distilled away. The residual was refined by silica gel column chromatography with a solvent mixture of methylene chloride and methanol with a volume ratio of 98:2 serving as an eluent to obtain 68.5 g of Intermediate 3 illustrated below.

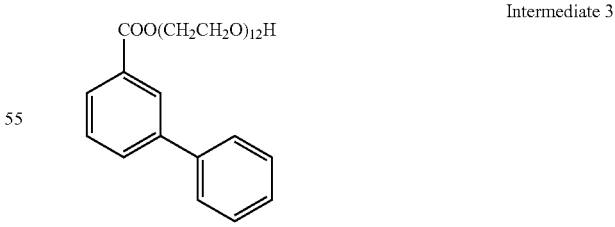

Intermediate 3

5.23 g of methacrylic acid chloride (manufactured by Tokyo Chemical Industry Co., Ltd.), 36.4 g of Intermediate 3, and 5.32 g of triethylamine (manufactured by Tokyo Chemical Industry Co., Ltd.) were dissolved in 50 mL of methylene chloride and stirred at room temperature for 4 hours. The thus-obtained reaction solution was rinsed with water and thereafter the organic phase was isolated followed by drying with magnesium sulfate and the solvent was distilled away. The residual was refined by silica gel column chromatography with a solvent mixture of methylene chloride and hexane with a volume ratio of 8:2 serving as an eluent to obtain 13.5 g of methacrylic acid derivative 3 illustrated below.

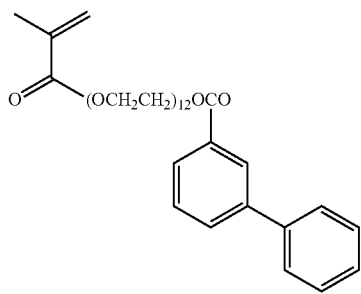

Methacrylic acid derivative 3

Next, Copolymer 3 (weight average molecular weight (Mw) of 41,200, number average molecular weight (Mn) of 20,300) having a solid portion concentration of 30 percent was obtained in the same manner as in Synthesis Example 1 except that the methacrylic acid derivative 3 was used instead of the methacrylic acid derivative 1.

Synthesis Example 4: Synthesis of Copolymer 4

2.00 g of the methacrylic acid derivative 1 was dissolved in 8.00 g of styrene (manufactured by Tokyo Chemical Industry Co., Ltd.), and 12.0 g of deionized water, 0.20 g of Aqualon BC-10 (manufactured by DKS Co. Ltd.), and 0.05 g of ammonium persulfate were added to form a pre-emulsion with a homomixer. Thereafter, 0.20 g of Aqualon BC-10 was added to 10.0 g of deionized water which had been heated to 80 degrees C. in argon atmosphere. Thereafter, 10 percent of the pre-emulsion was added to cause initial polymerization for 30 minutes. Thereafter, the rest of the pre-emulsion was dripped in two hours to cause polymerization followed by further polymerization at 80 degrees C. for two hours. Subsequent to cooling down, the resultant was filtered and neutralized with ammonium water to obtain Copolymer 4 (weight average molecular weight (Mw) of 46,500, number average molecular weight (Mn) of 28,800) having a solid portion concentration of 30 percent by mass.

Synthesis Example 5: Synthesis of Copolymer 5

20.0 g of biphenyl-3-carboxylic acid was gradually added to 46.0 g of triethylene glycol which had been heated to 80 degrees C. Thereafter, 1.0 g of sulfuric acid was added and the thus-obtained mixture was heated to 115 degrees C. and stirred for 4 hours.

Subsequent to cooling down to 40 degrees C., an aqueous solution in which 8.5 g of sodium hydrogen carbonate was dissolved in 50 m of water was added and the resultant was stirred for 15 minutes. 50 mL of toluene was added to the thus-obtained mixture to isolate the organic phase and thereafter toluene was distilled away. The residual was refined by silica gel column chromatography with a solvent mixture of methylene chloride and methanol with a volume ratio of 98:2 serving as an eluent to obtain 26.5 g of Intermediate 4 illustrated below.

Intermediate 4

5.23 g of methacrylic acid chloride (manufactured by Tokyo Chemical Industry Co., Ltd.), 16.5 g of Intermediate 4, and 5.32 g of triethylamine (manufactured by Tokyo Chemical Industry Co., Ltd.) were dissolved in 50 mL of methylene chloride and stirred at room temperature for 4 hours. The thus-obtained reaction solution was rinsed with water and thereafter the organic phase was isolated followed by drying with magnesium sulfate and the solvent was distilled away. The residual was refined by silica gel column chromatography with a solvent mixture of methylene chloride and hexane with a volume ratio of 8:2 serving as an eluent to obtain 16.1 g of methacrylic acid derivative 4 illustrated below.

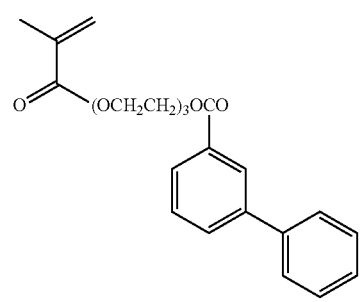

Methacrylic acid derivative 4

Next, Copolymer 5 (weight average molecular weight (Mw) of 40,300, number average molecular weight (Mn) of 21,100) having a solid portion concentration of 30 percent was obtained in the same manner as in Synthesis Example 4 except that the methacrylic acid derivative 4 was used instead of the methacrylic acid derivative 1.

Synthesis Example 6: Synthesis of Copolymer 6

Copolymer 6 (weight average molecular weight (Mw) of 45,500, number average molecular weight (Mn) of 26,900) having a solid portion concentration of 30 percent was obtained in the same manner as in Synthesis Example 4 except that the methacrylic acid derivative 2 was used instead of the methacrylic acid derivative 1.

Synthesis Example 7: Synthesis of Copolymer 7

Copolymer 7 (weight average molecular weight (Mw) of 43,600, number average molecular weight (Mn) of 25,200) having a solid portion concentration of 30 percent was obtained in the same manner as in Synthesis Example 4 except that the methacrylic acid derivative 3 was used instead of the methacrylic acid derivative 1.

Synthesis Example 8: Synthesis of Copolymer 8

1.00 g of the methacrylic acid derivative 4 was dissolved in 9.00 g of styrene (manufactured by Tokyo Chemical Industry Co., Ltd.), and 12.0 g of deionized water, 0.20 g of Aqualon BC-10 (manufactured by DKS Co. Ltd.), and 0.05 g of ammonium persulfate were added to form a pre-emulsion with a homomixer. Thereafter, 0.20 g of Aqualon BC-10 was added to 10.0 g of deionized water which had been heated to 80 degrees C. in argon atmosphere. Thereafter, 10 percent of the pre-emulsion was added to cause initial polymerization for 30 minutes. Thereafter, the rest of the pre-emulsion was dripped in two hours to cause polymerization followed by further polymerization at 80 degrees C. for two hours. Subsequent to cooling down, the resultant was filtered and neutralized with ammonium water to obtain Copolymer 8 (weight average molecular weight (Mw) of 44,600, number average molecular weight (Mn) of 23,600) having a solid portion concentration of 30 percent by mass.

Synthesis Example 9: Synthesis of Copolymer 9

0.05 g of the methacrylic acid derivative 4 was dissolved in 9.50 g of styrene (manufactured by Tokyo Chemical Industry Co., Ltd.), and 12.0 g of deionized water, 0.20 g of Aqualon BC-10 (manufactured by DKS Co. Ltd.), and 0.05 g of ammonium persulfate were added to form a pre-emulsion with a homomixer. Thereafter, 0.20 g of Aqualon BC-10 was added to 10.0 g of deionized water which had been heated to 80 degrees C. in argon atmosphere. Thereafter, 10 percent of the pre-emulsion was added to cause initial polymerization for 30 minutes. Thereafter, the rest of the pre-emulsion was dripped in two hours to cause polymerization followed by further polymerization at 80 degrees C. for two hours. Subsequent to cooling down, the resultant was filtered and neutralized with ammonium water to obtain Copolymer 9 (weight average molecular weight (Mw) of 44,000, number average molecular weight (Mn) of 23,200) having a solid portion concentration of 30 percent by mass.

Synthesis Example 10: Synthesis of Copolymer 10

20.0 g of biphenyl-3-carboxylic acid was gradually added to 60.0 g of tetraethylene glycol which had been heated to 80 degrees C. Thereafter, 1.0 g of sulfuric acid was added and the thus-obtained mixture was heated to 115 degrees C. and stirred for 4 hours. Subsequent to cooling down to 40 degrees C., an aqueous solution in which 8.5 g of sodium hydrogen carbonate was dissolved in 50 mL of water was added and the resultant was stirred for 15 minutes. 50 mL of toluene was added to the thus-obtained mixture to isolate the organic phase and thereafter toluene was distilled away. The residual was refined by silica gel column chromatography with a solvent mixture of methylene chloride and methanol with a volume ratio of 98:2 serving as an eluent to obtain 31.4 g of Intermediate 5 illustrated below.

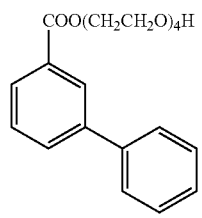

Intermediate 5

5.23 g of methacrylic acid chloride (manufactured by Tokyo Chemical Industry Co., Ltd.), 18.7 g of Intermediate 5, and 5.32 g of triethylamine (manufactured by Tokyo Chemical Industry Co., Ltd.) were dissolved in 50 mL of methylene chloride and stirred at room temperature for 4 hours. The thus-obtained reaction solution was rinsed with water and thereafter the organic phase was isolated followed by drying with magnesium sulfate and the solvent was distilled away. The residual was refined by silica gel column chromatography with a solvent mixture of methylene chloride and hexane with a volume ratio of 8:2 serving as an eluent to obtain 16.1 g of methacrylic acid derivative 5 illustrated below.

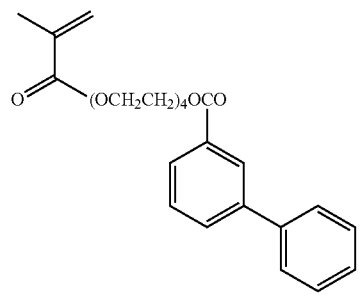

Methacrylic acid derivative 5

Copolymer 10 (weight average molecular weight (Mw) of 43,900, number average molecular weight (Mn) of 25,800) having a solid portion concentration of 30 percent was obtained in the same manner as in Synthesis Example 9 except that the methacrylic acid derivative 5 was used instead of the methacrylic acid derivative 4.

Synthesis Example 11: Synthesis of Copolymer 11

17.9 g of 2-naphthoic acid was gradually added to 33.0 g of diethylene glycol which had been heated to 80 degrees C. Thereafter, 1.0 g of sulfuric acid was added and the thus-obtained mixture was heated to 115 degrees C. and stirred for 4 hours. Subsequent to cooling down to 40 degrees C., an aqueous solution in which 8.5 g of sodium hydrogen carbonate was dissolved in 50 mL of water was added and the resultant was stirred for 15 minutes. 50 mL of toluene was added to the thus-obtained mixture to isolate the organic phase and thereafter toluene was distilled away. The residual was refined by silica gel column chromatography with a solvent mixture of methylene chloride and methanol with a volume ratio of 98:2 serving as an eluent to obtain 20.5 g of Intermediate 6 illustrated below.

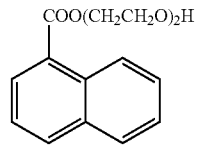

Intermediate 6

4.53 g of acrylic acid chloride (manufactured by Tokyo Chemical Industry Co., Ltd.), 13.0 g of Intermediate 6, and 5.31 g of triethylamine (manufactured by Tokyo Chemical Industry Co., Ltd.) were dissolved in 50 mL of methylene chloride and stirred at room temperature for 4 hours. The thus-obtained reaction solution was rinsed with water and thereafter the organic phase was isolated followed by drying with magnesium sulfate and the solvent was distilled away.

The residual was refined by silica gel column chromatography with a solvent mixture of methylene chloride and hexane with a volume ratio of 8:2 serving as an eluent to obtain 12.9 g of acrylic acid derivative 1 illustrated below.

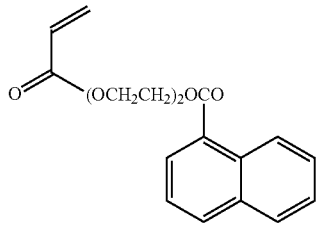

Acrylic acid derivative 1

4.00 g of the acrylic acid derivative 1 was dissolved in 6.00 g of styrene (manufactured by Tokyo Chemical Industry Co., Ltd.), and 12.0 g of deionized water, 0.20 g of Aqualon BC-10 (manufactured by DKS Co. Ltd.), and 0.05 g of ammonium persulfate were added to form a pre-emulsion with a homomixer. Thereafter, 0.20 g of Aqualon BC-10 was added to 10.0 g of deionized water which had been heated to 80 degrees C. in argon atmosphere. Thereafter, 10 percent of the pre-emulsion was added to cause initial polymerization for 30 minutes. Thereafter, the rest of the pre-emulsion was dripped in two hours to cause polymerization followed by further polymerization at 80 degrees C. for two hours. Subsequent to cooling down, the resultant was filtered and neutralized with ammonium water to obtain Copolymer 11 (weight average molecular weight (Mw) of 48,800, number average molecular weight (Mn) of 25,300) having a solid portion concentration of 30 percent by mass.

Synthesis Example 12: Synthesis of Copolymer 12

17.9 g of 2-naphthoic acid was gradually added to 88.0 g of hexaethylene glycol which had been heated to 80 degrees C. Thereafter, 1.0 g of sulfuric acid was added and the thus-obtained mixture was heated to 115 degrees C. and stirred for 4 hours. Subsequent to cooling down to 40 degrees C., an aqueous solution in which 8.5 g of sodium hydrogen carbonate was dissolved in 50 mL of water was added and the resultant was stirred for 15 minutes. 50 mL of toluene was added to the thus-obtained mixture to isolate the organic phase and thereafter toluene was distilled away. The residual was refined by silica gel column chromatography with a solvent mixture of methylene chloride and methanol with a volume ratio of 98:2 serving as an eluent to obtain 37.3 g of intermediate 7 illustrated below.

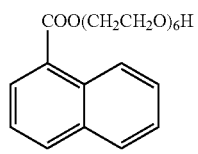

Intermediate 7

4.53 g of acrylic acid chloride (manufactured by Tokyo Chemical Industry Co., Ltd.), 21.8 g of Intermediate 7, and 5.31 g of triethylamine (manufactured by Tokyo Chemical Industry Co., Ltd.) were dissolved in 50 mL of methylene chloride and stirred at room temperature for 4 hours. The thus-obtained reaction solution was rinsed with water and thereafter the organic phase was isolated followed by drying with magnesium sulfate and the solvent was distilled away. The residual was refined by silica gel column chromatography with a solvent mixture of methylene chloride and hexane with a volume ratio of 8:2 serving as an eluent to obtain 22.2 g of acrylic acid derivative 2 illustrated below.

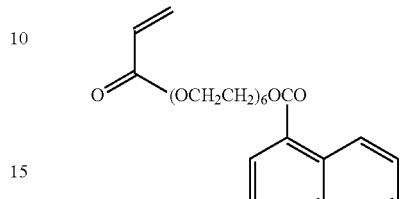

Acrylic acid derivative 2

Copolymer 12 (weight average molecular weight (Mw) of 47,000, number average molecular weight (Mn) of 27,200) having a solid portion concentration of 30 percent was obtained in the same manner as in Synthesis Example 11 except that the acrylic acid derivative 2 was used instead of the acrylic acid derivative 1.

Synthesis Example 13: Synthesis of Copolymer 13

17.9 g of 2-naphthoic acid was gradually added to 170.0 g of dodecaethylene glycol which had been heated to 80 degrees C. Thereafter, 1.0 g of sulfuric acid was added and the thus-obtained mixture was heated to 115 degrees C. and stirred for 4 hours. Subsequent to cooling down to 40 degrees C., an aqueous solution in which 8.5 g of sodium hydrogen carbonate was dissolved in 70 m of water was added and the resultant was stirred for 15 minutes. 50 mL of toluene was added to the thus-obtained mixture to isolate the organic phase and thereafter toluene was distilled away. The residual was refined by silica gel column chromatography with a solvent mixture of methylene chloride and methanol with a volume ratio of 98:2 serving as an eluent to obtain 68.5 g of intermediate 8 illustrated below.

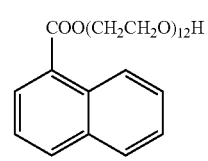

Intermediate 8

4.53 g of acrylic acid chloride (manufactured by Tokyo Chemical Industry Co., Ltd.), 35.0 g of Intermediate 8, and 5.31 g of triethylamine (manufactured by Tokyo Chemical Industry Co., Ltd.) were dissolved in 50 mL of methylene chloride and stirred at room temperature for 4 hours. The thus-obtained reaction solution was rinsed with water and thereafter the organic phase was isolated followed by drying with magnesium sulfate and the solvent was distilled away. The residual was refined by silica gel column chromatography with a solvent mixture of methylene chloride and hexane with a volume ratio of 8:2 serving as an eluent to obtain 33.8 g of acrylic acid derivative 3 illustrated below.

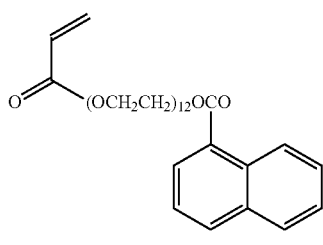

Acrylic acid derivative 3

Next, Copolymer 13 (weight average molecular weight (Mw) of 41,000, number average molecular weight (Mn) of 21,300) having a solid portion concentration of 30 percent was obtained in the same manner as in Synthesis Example 11 except that the acrylic acid derivative 3 was used instead of the acrylic acid derivative 1.

Synthesis Example 14: Synthesis of Copolymer 14

2.00 g of the acrylic acid derivative 1 was dissolved in 8.00 g of styrene (manufactured by Tokyo Chemical Industry Co., Ltd.), and 12.0 g of deionized water, 0.20 g of Aqualon BC-10 (manufactured by DKS Co. Ltd.), and 0.05 g of ammonium persulfate were added to form a pre-emulsion with a homomixer. Thereafter, 0.20 g of Aqualon BC-10 was added to 10.0 g of deionized water which had been heated to 80 degrees C. in argon atmosphere. Thereafter, 10 percent of the pre-emulsion was added to cause initial polymerization for 30 minutes. Thereafter, the rest of the pre-emulsion was dripped in two hours to cause polymerization followed by further polymerization at 80 degrees C. for two hours. Subsequent to cooling down, the resultant was filtered and neutralized with ammonium water to obtain Copolymer 14 (weight average molecular weight (Mw) of 45,400, number average molecular weight (Mn) of 28,500) having a solid portion concentration of 30 percent by mass.

Synthesis Example 15: Synthesis of Copolymer 15

17.9 g of 2-naphthoic acid was gradually added to 46.8 g of triethylene glycol which had been heated to 80 degrees C. Thereafter, 1.0 g of sulfuric acid was added and the thus-obtained mixture was heated to 115 degrees C. and stirred for 4 hours. Subsequent to cooling down to 40 degrees C., an aqueous solution in which 8.5 g of sodium hydrogen carbonate was dissolved in 50 mL of water was added and the resultant was stirred for 15 minutes. 50 mL of toluene was added to the thus-obtained mixture to isolate the organic phase and thereafter toluene was distilled away. The residual was refined by silica gel column chromatography with a solvent mixture of methylene chloride and methanol with a volume ratio of 98:2 serving as an eluent to obtain 24.9 g of Intermediate 9 illustrated below.

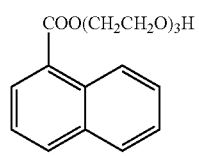

Intermediate 9

4.53 g of acrylic acid chloride (manufactured by Tokyo Chemical Industry Co., Ltd.), 15.2 g of Intermediate 9, and 5.32 g of triethylamine (manufactured by Tokyo Chemical Industry Co., Ltd.) were dissolved in 50 mL of methylene chloride and stirred at room temperature for 4 hours. The thus-obtained reaction solution was rinsed with water and thereafter the organic phase was isolated followed by drying with magnesium sulfate and the solvent was distilled away. The residual was refined by silica gel column chromatography with a solvent mixture of methylene chloride and hexane with a volume ratio of 8:2 serving as an eluent to obtain 15.0 g of acrylic acid derivative 4 illustrated below.

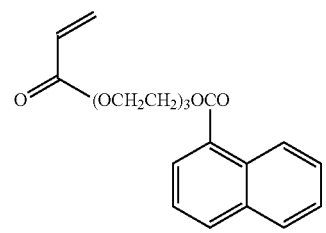

Acrylic acid derivative 4

Copolymer 15 (weight average molecular weight (Mw) of 40,800, number average molecular weight (Mn) of 21,800) having a solid portion concentration of 30 percent was obtained in the same manner as in Synthesis Example 14 except that the acrylic acid derivative 4 was used instead of the acrylic acid derivative 1.

Synthesis Example 16: Synthesis of Copolymer 16

Copolymer 16 (weight average molecular weight (Mw) of 44,400, number average molecular weight (Mn) of 26,000) having a solid portion concentration of 30 percent was obtained in the same manner as in Synthesis Example 14 except that the acrylic acid derivative 2 was used instead of the acrylic acid derivative 1.

Synthesis Example 17: Synthesis of Copolymer 17

Copolymer 17 having a solid portion concentration of 30 percent (weight average molecular weight (Mw) of 42,900, number average molecular weight (Mn) of 24,200) was obtained in the same manner as in Synthesis Example 14 except that the acrylic acid derivative 3 was used instead of the acrylic acid derivative 1.

Synthesis Example 18: Synthesis of Copolymer 18

4.53 g of acrylic acid chloride (manufactured by Tokyo Chemical Industry Co., Ltd.), 13.8 g of Intermediate 10 (NOIGEN EN-10, manufactured by DKS Co. Ltd.) illustrated below, and 5.32 g of triethylamine (manufactured by Tokyo Chemical Industry Co., Ltd.) were dissolved in 50 mL of methylene chloride and stirred at room temperature for 4 hours. The thus-obtained reaction solution was rinsed with water and thereafter the organic phase was isolated followed by drying with magnesium sulfate and the solvent was distilled away. The residual was refined by silica gel column chromatography with a solvent mixture of methylene chloride and hexane with a volume ratio of 8:2 serving as an eluent to obtain 12.3 g of acrylic acid derivative 5 illustrated below.

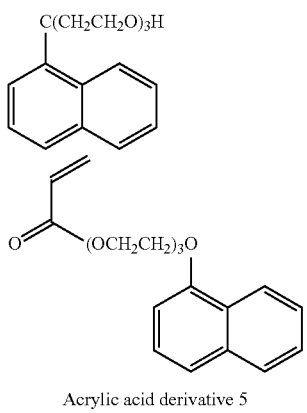

Acrylic acid derivative 5

2.00 g of the acrylic acid derivative 5 was dissolved in 8.00 g of styrene (manufactured by Tokyo Chemical Industry Co., Ltd.), and 12.0 g of deionized water, 0.20 g of Aqualon BC-10 (manufactured by DKS Co. Ltd.), and 0.05 g of ammonium persulfate were added to form a pre-emulsion with a homomixer. Thereafter, 0.20 g of Aqualon BC-10 was added to 10.0 g of deionized water which had been heated to 80 degrees C. in argon atmosphere. Thereafter, 10 percent of the pre-emulsion was added to cause initial polymerization for 30 minutes. Thereafter, the rest of the pre-emulsion was dripped in two hours to cause polymerization followed by further polymerization at 80 degrees C. for two hours. Subsequent to cooling down, the resultant was filtered and neutralized with ammonium water to obtain Copolymer 18 (weight average molecular weight (Mw) of 39,800, number average molecular weight (Mn) of 22,100) having a solid portion concentration of 30 percent by mass.

Synthesis Example 19: Synthesis of Copolymer 19

1.00 g of the acrylic acid derivative 5 was dissolved in 9.00 g of styrene (manufactured by Tokyo Chemical Industry Co., Ltd.), and 12.0 g of deionized water, 0.20 g of Aqualon BC-10 (manufactured by DKS Co. Ltd.), and 0.05 g of ammonium persulfate were added to form a pre-emulsion with a homomixer. Thereafter, 0.20 g of Aqualon BC-10 was added to 10.0 g of deionized water which had been heated to 80 degrees C. in argon atmosphere. Thereafter, 10 percent of the pre-emulsion was added to cause initial polymerization for 30 minutes. Thereafter, the rest of the pre-emulsion was dripped in two hours to cause polymerization followed by further polymerization at 80 degrees C. for two hours. Subsequent to cooling down, the resultant was filtered and neutralized with ammonium water to obtain Copolymer 19 (weight average molecular weight (Mw) of 40,600, number average molecular weight (Mn) of 23,200) having a solid portion concentration of 30 percent by mass.

Synthesis Example 20: Synthesis of Copolymer 20

0.50 g of the acrylic acid derivative 5 was dissolved in 9.50 g of styrene (manufactured by Tokyo Chemical Industry Co., Ltd.), and 12.0 g of deionized water, 0.20 g of Aqualon BC-10 (manufactured by DKS Co. Ltd.), and 0.05 g of ammonium persulfate were added to form a pre-emulsion with a homomixer. Thereafter, 0.20 g of Aqualon BC-10 was added to 10.0 g of deionized water which had been heated to 80 degrees C. in argon atmosphere. Thereafter, 10 percent of the pre-emulsion was added to cause initial polymerization for 30 minutes. Thereafter, the rest of the pre-emulsion was dripped in two hours to cause polymerization followed by further polymerization at 80 degrees C. for two hours. Subsequent to cooling down, the resultant was filtered and neutralized with ammonium water to obtain Copolymer 20 (weight average molecular weight (Mw) of 41,400, number average molecular weight (Mn) of 23,900) having a solid portion concentration of 30 percent by mass.

The composition, weight average molecular weight, and number average molecular weight of the copolymers 1 to 20 are shown in Table 1. In Table 1, 1:2 is the mass ratio between the structure unit of Chemical formula 1 and the structure unit of Chemical formula 2, and p, L, and M are p, L, and M of Chemical formula 2.

Comparative Synthesis Example 1: Synthesis of Comparative Copolymer 1

4.00 g of 2-ethylhexylacrylate was dissolved in 6.00 g of styrene (manufactured by Tokyo Chemical Industry Co., Ltd.), and 12.0 g of deionized water, 0.20 g of Aqualon BC-10 (manufactured by DKS Co. Ltd.), and 0.05 g of ammonium persulfate were added to form a pre-emulsion with a homomixer. Thereafter, 0.20 g of Aqualon BC-10 was added to 10.0 g of deionized water, which was heated to 80 degrees C. in argon atmosphere. Thereafter, 10 percent of the pre-emulsion was added to cause initial polymerization for 30 minutes.

Thereafter, the rest of the pre-emulsion was dripped in two hours to cause polymerization followed by further polymerization at 80 degrees C. for two hours.

Subsequent to cooling down, the resultant was filtered and neutralized with ammonium water to obtain Comparative copolymer 1 (weight average molecular weight (Mw) of 38,400, number average molecular weight (Mn) of 18,900) having a solid portion concentration of 30 percent by mass.

Comparative Synthesis Example 2: Synthesis of Comparative Copolymer 2

2.00 g of 2-ethylhexylacrylate was dissolved in 8.00 g of styrene (manufactured by Tokyo Chemical Industry Co., Ltd.), and 12.0 g of deionized water, 0.20 g of Aqualon BC-10 (manufactured by DKS Co. Ltd.), and 0.05 g of ammonium persulfate were added to form a pre-emulsion with a homomixer. Thereafter, 0.20 g of Aqualon BC-10 was added to 10.0 g of deionized water which had been heated to 80 degrees C. in argon atmosphere. Thereafter, 10 percent of the pre-emulsion was added to cause initial polymerization for 30 minutes.

Thereafter, the rest of the pre-emulsion was dripped in two hours to cause polymerization followed by further polymerization at 80 degrees C. for two hours.

Subsequent to cooling down, the resultant was filtered and neutralized with ammonium water to obtain Comparative copolymer 2 (weight average molecular weight (Mw) of 37,500, number average molecular weight (Mn) of 17,900) having a solid portion concentration of 30 percent by mass.

Comparative Synthesis Example 3: Synthesis of Comparative Copolymer 3

1.00 g of 2-ethylhexylacrylate was dissolved in 9.00 g of styrene (manufactured by Tokyo Chemical Industry Co., Ltd.), and 12.0 g of deionized water, 0.20 g of Aqualon BC-10 (manufactured by DKS Co. Ltd.), and 0.05 g of ammonium persulfate were added to form a pre-emulsion with a homomixer. Thereafter, 0.20 g of Aqualon BC-10 was added to 10.0 g of deionized water which had been heated to 80 degrees C. in argon atmosphere. Thereafter, 10 percent of the pre-emulsion was added to cause initial polymerization for 30 minutes. Thereafter, the rest of the pre-emulsion was dripped in two hours to cause polymerization followed by further polymerization at 80 degrees C. for two hours. Subsequent to cooling down, the resultant was filtered and neutralized with ammonium water to obtain Comparative copolymer 3 (weight average molecular weight (Mw) of 40,100, number average molecular weight (Mn) of 20,700) having a solid portion concentration of 30 percent by mass.

Comparative Synthesis Example 4: Synthesis of Comparative Copolymer 4

0.50 g of 2-ethylhexylacrylate was dissolved in 9.50 g of styrene (manufactured by Tokyo Chemical Industry Co., Ltd.), and 12.0 g of deionized water, 0.20 g of Aqualon BC-10 (manufactured by DKS Co. Ltd.), and 0.05 g of ammonium persulfate were added to form a pre-emulsion with a homomixer. Thereafter, 0.20 g of Aqualon BC-10 was added to 10.0 g of deionized water which had been heated to 80 degrees C. in argon atmosphere. Thereafter, 10 percent of the pre-emulsion was added to cause initial polymerization for 30 minutes. Thereafter, the rest of the pre-emulsion was dripped in two hours to cause polymerization followed by further polymerization at 80 degrees C. for two hours.

Subsequent to cooling down, the resultant was filtered and neutralized with ammonium water to obtain Comparative copolymer 4 (weight average molecular weight (Mw) of 41,500, number average molecular weight (Mn) of 21,600) having a solid portion concentration of 30 percent by mass.

Comparative Synthesis Example 5: Synthesis of Comparative Copolymer 5

12.0 g of deionized water, 0.20 g of Aqualon BC-10 (manufactured by DKS Co. Ltd.), and 0.05 g of ammonium persulfate were added to 10.00 g of the acrylic acid derivative 5 to form a pre-emulsion with a homomixer. Thereafter, 0.20 g of Aqualon BC-10 was added to 10.0 g of deionized water which had been heated to 80 degrees C. in argon atmosphere. Thereafter, 10 percent of the pre-emulsion was added to cause initial polymerization for 30 minutes. Thereafter, the rest of the pre-emulsion was dripped in two hours to cause polymerization followed by further polymerization at 80 degrees C. for two hours. Subsequent to cooling down, the resultant was filtered and neutralized with ammonium water to obtain Copolymer 18 (weight average molecular weight (Mw) of 35,700, number average molecular weight (Mn) of 19,300) having a solid portion concentration of 30 percent by mass.

Example 1

After mixing the following materials and stirring for 30 minutes to prepare aqueous solution 1, 37.50 parts of a carbon black pigment dispersion (solid content: 20.0 percent, DX 2440K manufactured by Cabot Corporation) was added and stirred for 10 minutes.

| | |
|---|---|
| 2-ethyl-1,3-hexane diol: | 2.00 parts |
| Glycerol: | 10.00 parts |

-continued

| | |
|---|---|
| 3-methoxy-N,N-dimethyl propaneamide: | 15.00 parts |
| 3-buthoxy-N,N-dimethyl propaneamide: | 15.00 parts |
| 2-(cyclohexylamono) ethane sulfonic acid: | 0.05 parts |
| 2,4,7,9-tetramethyl-4,7-decanediol: | 0.50 parts |
| Fluorochemical surfactant: (ZONYL FS-300, manufactured by E. I. du Pont de Nemours and Company): | 0.25 parts |
| Diethanol amine: | 0.01 parts |
| Deionized water: | 12.93 parts |

Next, 6.67 parts of Copolymer 1 (solid portion of 30 percent) prepared in Synthesis Example 1 was added and stirred for 20 minutes. Thereafter, the thus-obtained mixture was filtered with a membrane filter having an average pore diameter of 0.8 µm to obtain Ink 1 of Example.

Examples 2 to 20

Inks 2 to 20 were obtained in the same manner as in Example 1 except that the copolymers 2 to 20 (solid portion of 30 percent) prepared in Synthesis Examples 2 to 20 were used in place of Copolymer 1 used in Example 1.

Comparative Examples 1 to 5

Comparative inks 1 to 5 were obtained in the same manner as in Example 1 except that Comparative copolymers 1 to 5 were used in place of Copolymer 1.

Details of the copolymer material are shown in Table 1. Properties of each ink prepared in Examples and Comparative Examples were evaluated in the following manner. The results are shown in Table 2.

Image Density

An inkjet printer (IPSiO GXe 5500, manufactured by Ricoh Company, Ltd.) was filled with each ink in an environment of 23 degrees C. and 50 percent RH, and the chart including 64 point general symbol of JIS X 0208 (1997), 2223 created by Microsoft Word 2000 (manufactured by Microsoft Corporation) was printed on plain paper (NEXT-U, manufactured by NIPPON PAPER INDUSTRIES CO., LTD.) and coated paper (LumiArtGloss 90M, manufactured by Stora Enso Oyj). After the plain paper was left in the environment of 23 degrees C. and 50 percent RH for 12 hours or the coated paper was dried in a drier at 100 degrees C. for 30 seconds one minute after the printing and left in the environment of 23 degrees C. and 50 percent RH, the symbol portion of the printed surface was measured with X-Rite 938 (manufactured by X-Rite Inc.) and evaluated according to the following criteria. The print mode was: A mode in which "Plain Paper—Standard Fast" was modified to "No Color Calibration" from the user setting for plain paper by the driver installed onto the printer. The symbol of JIS X 0208 (1997), 2223 had a square for the exterior and the inside thereof was entirely painted with ink.

Evaluation Criteria 1: Plain Paper
A: 1.50 or higher
B: 1.30 to less than 1.50
C: 1.10 to less than 1.30
D: 1.00 to less than 1.10
E: 0.90 to less than 1.00

Evaluation Criteria 2: Coated Paper
A: 2.0 or higher
B: 1.80 to less than 2.00
C: 1.60 to less than 1.80
D: 1.40 to less than 1.60
E: 1.20 to less than 1.40

Storage Stability of Ink

An ink cartridge was filled with each ink and stored at 60 degrees C. for one week. Viscosity (Pa·s) of the ink was measured before and after the storage. The change rate of the viscosity after the storage to the viscosity before the storage was obtained from the following relation and evaluated according to the following criteria. Viscosity was measured by a viscometer (RE80L, manufactured by TOKI SANGYO CO., LTD.) to measure the viscosity of the ink at 25 degrees C. at 50 rotations.

Viscosity Change Rate={Viscosity of ink after storage−Viscosity of ink before storage}/(Viscosity of ink before storage)×100

Evaluation Criteria
A: Change rate of viscosity within the range of from −5% to +5%
B: Change rate of viscosity within the range of from −10% to less than −5% and more than 5% to 10%
C: Change rate of viscosity within the range of from −20% to less than −10% and more than 10% to 20%.
D: Change rate of viscosity within the range of from −50% to less than −20% and more than 20% to 50%
E: Change rate of viscosity less than −50% or greater than 50% (gelated, evaluation was not possible)

Beading

The general symbol of JIS X 0208 (1997), 2223 was printed in the same manner as for Image Density except that the print mode was changed to the mode "gloss paper—fast" using Lumi Art Gloss 90GSM (manufactured by Stora Enso Oyj) as the recording medium and the printed symbol was evaluated according to the following criteria. The portion without the dots increases from A towards E between the printed portions of the square dots.

Evaluation Criteria
A: No beading occurred
B: Beading occurred to 10 to 20 percent of entire image
C: Beading occurred to 21 to 40 percent of entire image
D: Beading occurred to 41 to 90 percent of entire image
E: Beading occurred to entire image

TABLE 1

|  |  | 1:2 | 2 | | | | |
|---|---|---|---|---|---|---|---|
|  |  | Mass ratio | p | L | M | Mw | Mn |
| Synthesis Example 1 | Copolymer 1 | 60:40 | 2 | Carbonyl | 3-biphenyl | 48,000 | 24,800 |
| Synthesis Example 2 | Copolymer 2 | 60:40 | 6 | Carbonyl | 3-biphenyl | 49,100 | 25,000 |
| Synthesis Example 3 | Copolymer 3 | 60:40 | 12 | Carbonyl | 3-biphenyl | 41,200 | 20,300 |
| Synthesis Example 4 | Copolymer 4 | 80:20 | 2 | Carbonyl | 3-biphenyl | 46,500 | 28,800 |
| Synthesis Example 5 | Copolymer 5 | 80:20 | 3 | Carbonyl | 3-biphenyl | 40,300 | 21,100 |
| Synthesis Example 6 | Copolymer 6 | 80:20 | 6 | Carbonyl | 3-biphenyl | 45,500 | 26,900 |
| Synthesis Example 7 | Copolymer 7 | 80:20 | 12 | Carbonyl | 3-biphenyl | 43,600 | 25,200 |
| Synthesis Example 8 | Copolymer 8 | 90:10 | 3 | Carbonyl | 3-biphenyl | 44,600 | 23,600 |
| Synthesis Example 9 | Copolymer 9 | 95:5 | 3 | Carbonyl | 3-biphenyl | 44,000 | 23,200 |
| Synthesis Example 10 | Copolymer 10 | 95:5 | 4 | Carbonyl | 3-biphenyl | 43,900 | 25,800 |
| Synthesis Example 11 | Copolymer 11 | 60:40 | 2 | Carbonyl | 2-naphthyl | 48,800 | 25,300 |
| Synthesis Example 12 | Copolymer 12 | 60:40 | 6 | Carbonyl | 2-naphthyl | 47,000 | 27,200 |
| Synthesis Example 13 | Copolymer 13 | 60:40 | 12 | Carbonyl | 2-naphthyl | 41,000 | 21,300 |
| Synthesis Example 14 | Copolymer 14 | 80:20 | 2 | Carbonyl | 2-naphthyl | 45,400 | 28,500 |
| Synthesis Example 15 | Copolymer 15 | 80:20 | 3 | Carbonyl | 2-naphthyl | 40,800 | 21,800 |
| Synthesis Example 16 | Copolymer 16 | 80:20 | 6 | Carbonyl | 2-naphthyl | 44,400 | 26,000 |
| Synthesis Example 17 | Copolymer 17 | 80:20 | 12 | Carbonyl | 2-naphthyl | 42,900 | 24,200 |
| Synthesis Example 18 | Copolymer 18 | 80:20 | 3 | Single bond | 1-naphthyl | 39,800 | 22,100 |
| Synthesis Example 19 | Copolymer 19 | 90:10 | 3 | Single bond | 1-naphthyl | 40,600 | 23,200 |

TABLE 1-continued

|  |  | 1:2 | 2 | | | | |
|---|---|---|---|---|---|---|---|
|  |  | Mass ratio | p | L | M | Mw | Mn |
| Synthesis Example 20 | Copolymer 20 | 95:5 | 3 | Single bond | 1-naphthyl | 41,400 | 23,900 |

TABLE 2

| | | Image Density | | | |
|---|---|---|---|---|---|
| | Copolymer Kind | Plain paper | Coated paper | Storage Stability | Beading |
| Example 1 | Copolymer 1 | B | B | A | A |
| Example 2 | Copolymer 2 | B | B | A | A |
| Example 3 | Copolymer 3 | B | B | A | A |
| Example 4 | Copolymer 4 | B | A | A | B |
| Example 5 | Copolymer 5 | B | A | A | B |
| Example 6 | Copolymer 6 | B | A | A | B |
| Example 7 | Copolymer 7 | A | A | A | A |
| Example 8 | Copolymer 8 | A | A | A | A |
| Example 9 | Copolymer 9 | A | A | A | A |
| Example 10 | Copolymer 10 | A | A | A | A |
| Example 11 | Copolymer 11 | B | B | A | A |
| Example 12 | Copolymer 12 | B | B | A | B |
| Example 13 | Copolymer 13 | B | B | A | A |
| Example 14 | Copolymer 14 | B | B | A | A |
| Example 15 | Copolymer 15 | B | B | A | A |
| Example 16 | Copolymer 16 | B | B | A | A |
| Example 17 | Copolymer 17 | A | A | A | A |
| Example 18 | Copolymer 18 | A | A | A | A |
| Example 19 | Copolymer 19 | A | A | A | B |
| Example 20 | Copolymer 20 | A | A | A | A |
| Comparative Example 1 | Comparative copolymer 1 | E | E | A | B |
| Comparative Example 2 | Comparative copolymer 2 | D | E | A | B |
| Comparative Example 3 | Comparative copolymer 3 | C | D | A | C |
| Comparative Example 4 | Comparative copolymer 4 | C | D | B | C |
| Comparative Example 5 | Comparative copolymer 5 | C | C | B | A |

Synthesis Example 21: Synthesis of Copolymer 21

After 21.7 g of biphenyl-3-carboxylic acid (manufactured by Tokyo Chemical Industry Co., Ltd.) was gradually added to 25.0 g of propylene glycol (manufactured by Tokyo Chemical Industry Co., Ltd.) which had been heated to 80 degrees C., 1.0 g of sulfuric acid was added and the mixture was heated to 115 degrees C. and stirred for 4 hours. Subsequent to cooling down to 40 degrees C., an aqueous solution in which 8.5 g of sodium hydrogen carbonate was dissolved in 50 mL of water was added and the resultant was stirred for 15 minutes. 50 mL of toluene was added to the thus-obtained mixture to isolate the organic phase and thereafter toluene was distilled away. The residual obtained by distilling away the solvent was refined by silica gel column chromatography with a solvent mixture of methylene chloride and methanol with a volume ratio of 98:2 serving as an eluent to obtain 20.5 g of Intermediate 11 illustrated below.

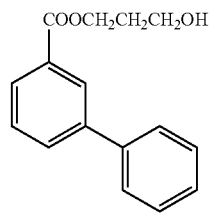

Intermediate 11

5.23 g of methacrylic acid chloride (manufactured by Tokyo Chemical Industry Co., Ltd.), 12.8 g of Intermediate 11, and 5.32 g of triethylamine (manufactured by Tokyo Chemical Industry Co., Ltd.) were dissolved in 50 mL of methylene chloride and stirred at room temperature for 4 hours. The thus-obtained reaction solution was rinsed with water and thereafter the organic phase was isolated followed by drying with magnesium sulfate and the solvent was distilled away. The residual was refined by silica gel column chromatography with a solvent mixture of methylene chloride and hexane with a volume ratio of 8:2 serving as an eluent to obtain 14.5 g of methacrylic acid derivative 6 illustrated below.

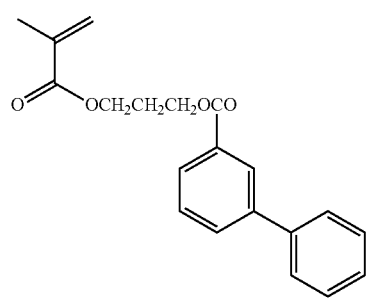

Methacrylic acid derivative 6

Next, 4.00 g of methacrylic acid derivative 6 was dissolved in 6.00 g of styrene (manufactured by Tokyo Chemical Industry Co., Ltd.), and 12.0 g of deionized water, 0.20 g of polyoxyethylene nonyl propenyl phenyl ether ammonium sulfate (Aqualon BC-10, manufactured by DKS Co. Ltd.), and 0.05 g of ammonium persulfate were added to form a pre-emulsion with a homomixer. Thereafter, 0.20 g of Aqualon BC-10 was added to 10.0 g of deionized water, which was heated to 80 degrees C. in argon atmosphere. Thereafter, 10 percent of the pre-emulsion was added to cause initial polymerization for 30 minutes. Thereafter, the rest of the pre-emulsion was dripped in two hours to cause polymerization followed by further polymerization at 80 degrees C. for two hours. Subsequent to cooling down, the resultant was filtered and neutralized with ammonium water to obtain Copolymer 21 (weight average molecular weight (Mw) of 44,000, number average molecular weight (Mn) of 21,700) having a solid portion concentration of 30 percent by mass.

Synthesis Example 22: Synthesis of Copolymer 22

20.2 g of biphenyl-3-carboxylic acid was gradually added to 41.0 g of dipropylene glycol which had been heated to 80 degrees C. Thereafter, 1.0 g of sulfuric acid was added and the thus-obtained mixture was heated to 115 degrees C. and stirred for 4 hours. Subsequent to cooling down to 40 degrees C., an aqueous solution in which 8.5 g of sodium hydrogen carbonate was dissolved in 50 mL of water was added and the resultant was stirred for 15 minutes. 50 mL of toluene was added to the thus-obtained mixture to isolate the organic phase and thereafter toluene was distilled away. The residual obtained by distilling away the solvent was refined by silica gel column chromatography with a solvent mixture of methylene chloride and methanol with a volume ratio of 98:2 serving as an eluent to obtain 29.2 g of Intermediate 12 illustrated below.

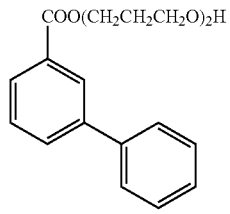

Intermediate 12

5.23 g of methacrylic acid chloride (manufactured by Tokyo Chemical Industry Co., Ltd.), 15.7 g of Intermediate 12, and 5.32 g of triethylamine (manufactured by Tokyo Chemical Industry Co., Ltd.) were dissolved in 50 mL of methylene chloride and stirred at room temperature for 4 hours. The thus-obtained reaction solution was rinsed with water and thereafter the organic phase was isolated followed by drying with magnesium sulfate and the solvent was distilled away. The residual was refined by silica gel column chromatography with a solvent mixture of methylene chloride and hexane with a volume ratio of 8:2 serving as an eluent to obtain 17.3 g of methacrylic acid derivative 7 illustrated below.

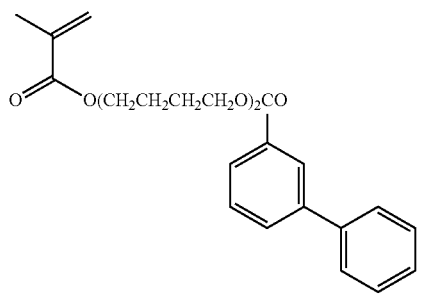

Methacrylic acid derivative 7

Copolymer 22 (weight average molecular weight (Mw) of 47,000, number average molecular weight (Mn) of 22,900) having a solid portion concentration of 30 percent was obtained in the same manner as in Synthesis Example 21 except that the methacrylic acid derivative 7 was used instead of the methacrylic acid derivative 6.

Synthesis Example 23: Synthesis of Copolymer 23

20.2 g of biphenyl-3-carboxylic acid was gradually added to 46.0 g of tetrapropylene glycol which had been heated to 80 degrees C. Thereafter, 1.0 g of sulfuric acid was added and the thus-obtained mixture was heated to 115 degrees C. and stirred for 4 hours. Subsequent to cooling down to 40 degrees C., an aqueous solution in which 8.5 g of sodium hydrogen carbonate was dissolved in 70 mL of water was added and the resultant was stirred for 15 minutes. 50 mL of toluene was added to the thus-obtained mixture to isolate the organic phase and thereafter toluene was distilled away. The residual obtained by distilling away the solvent was refined by silica gel column chromatography with a solvent mixture of methylene chloride and methanol with a volume ratio of 98:2 serving as an eluent to obtain 28.5 g of Intermediate 13 illustrated below.

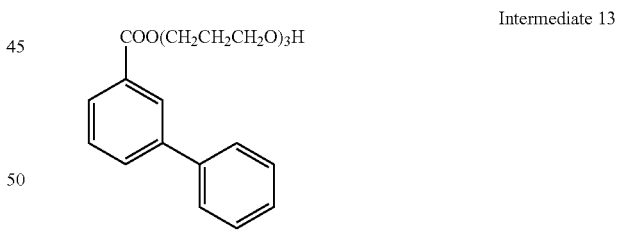

Intermediate 13

5.23 g of methacrylic acid chloride (manufactured by Tokyo Chemical Industry Co., Ltd.), 18.6 g of Intermediate 13, and 5.32 g of triethylamine (manufactured by Tokyo Chemical Industry Co., Ltd.) were dissolved in 50 mL of methylene chloride and stirred at room temperature for 4 hours. The thus-obtained reaction solution was rinsed with water and thereafter the organic phase was isolated followed by drying with magnesium sulfate and the solvent was distilled away. The residual was refined by silica gel column chromatography with a solvent mixture of methylene chloride and hexane with a volume ratio of 8:2 serving as an eluent to obtain 23.5 g of methacrylic acid derivative 8 illustrated below.

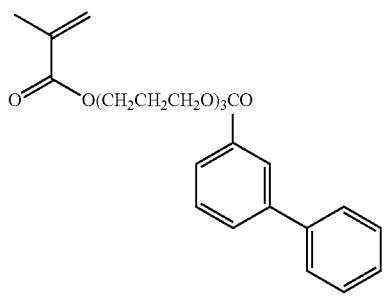

Methacrylic acid derivative 8

Next, Copolymer 23 (weight average molecular weight (Mw) of 38,300, number average molecular weight (Mn) of 18,800) having a solid portion concentration of 30 percent was obtained in the same manner as in Synthesis Example 21 except that the methacrylic acid derivative 8 was used instead of the methacrylic acid derivative 6.

Synthesis Example 24: Synthesis of Copolymer 24

2.00 g of the methacrylic acid derivative 6 was dissolved in 8.00 g of styrene (manufactured by Tokyo Chemical Industry Co., Ltd.), and 12.0 g of deionized water, 0.20 g of Aqualon BC-10 (manufactured by DKS Co. Ltd.), and 0.05 g of ammonium persulfate were added to form a pre-emulsion with a homomixer. Thereafter, 0.20 g of Aqualon BC-10 was added to 10.0 g of deionized water which had been heated to 80 degrees C. in argon atmosphere. Thereafter, 10 percent of the pre-emulsion was added to cause initial polymerization for 30 minutes. Thereafter, the rest of the pre-emulsion was dripped in two hours to cause polymerization followed by further polymerization at 80 degrees C. for two hours. Subsequent to cooling down, the resultant was filtered and neutralized with ammonium water to obtain Copolymer 24 (weight average molecular weight (Mw) of 44,100, number average molecular weight (Mn) of 27,100) having a solid portion concentration of 30 percent by mass.

Synthesis Example 25: Synthesis of Copolymer 25

Copolymer 25 (weight average molecular weight (Mw) of 41,200, number average molecular weight (Mn) of 22,200) having a solid portion concentration of 30 percent was obtained in the same manner as in Synthesis Example 24 except that the methacrylic acid derivative 7 was used instead of the methacrylic acid derivative 6.

Synthesis Example 26: Synthesis of Copolymer 26

1.00 g of the methacrylic acid derivative 6 was dissolved in 9.00 g of styrene (manufactured by Tokyo Chemical Industry Co., Ltd.), and 12.0 g of deionized water, 0.20 g of Aqualon BC-10 (manufactured by DKS Co. Ltd.), and 0.05 g of ammonium persulfate were added to form a pre-emulsion with a homomixer. Thereafter, 0.20 g of Aqualon BC-10 was added to 10.0 g of deionized water which had been heated to 80 degrees C. in argon atmosphere. Thereafter, 10 percent of the pre-emulsion was added to cause initial polymerization for 30 minutes. Thereafter, the rest of the pre-emulsion was dripped in two hours to cause polymerization followed by further polymerization at 80 degrees C. for two hours. Subsequent to cooling down, the resultant was filtered and neutralized with ammonium water to obtain Copolymer 26 (weight average molecular weight (Mw) of 40,300, number average molecular weight (Mn) of 25,300) having a solid portion concentration of 30 percent by mass.

Synthesis Example 27: Synthesis of Copolymer 27

Copolymer 27 having a solid portion concentration of 30 percent (weight average molecular weight (Mw) of 44,000, number average molecular weight (Mn) of 25,000) was obtained in the same manner as in Synthesis Example 26 except that the methacrylic acid derivative 7 was used instead of the methacrylic acid derivative 6.

Synthesis Example 28: Synthesis of Copolymer 28

0.50 g of the methacrylic acid derivative 6 was dissolved in 9.50 g of styrene (manufactured by Tokyo Chemical Industry Co., Ltd.), and 12.0 g of deionized water, 0.20 g of Aqualon BC-10 (manufactured by DKS Co. Ltd.), and 0.05 g of ammonium persulfate were added to form a pre-emulsion with a homomixer. Thereafter, 0.20 g of Aqualon BC-10 was added to 10.0 g of deionized water which had been heated to 80 degrees C. in argon atmosphere. Thereafter, 10 percent of the pre-emulsion was added to cause initial polymerization for 30 minutes. Thereafter, the rest of the pre-emulsion was dripped in two hours to cause polymerization followed by further polymerization at 80 degrees C. for two hours. Subsequent to cooling down, the resultant was filtered and neutralized with ammonium water to obtain Copolymer 28 (weight average molecular weight (Mw) of 41,500, number average molecular weight (Mn) of 21,100) having a solid portion concentration of 30 percent by mass.

Synthesis Example 29: Synthesis of Copolymer 29

Copolymer 29 (weight average molecular weight (Mw) of 40,800, number average molecular weight (Mn) of 20,500) having a solid portion concentration of 30 percent was obtained in the same manner as in Synthesis Example 28 except that the methacrylic acid derivative 7 was used instead of the methacrylic acid derivative 6.

Synthesis Example 30: Synthesis of Copolymer 30

Copolymer 30 having a solid portion concentration of 30 percent (weight average molecular weight (Mw) of 42,700, number average molecular weight (Mn) of 22,800) was obtained in the same manner as in Synthesis Example 28 except that the methacrylic acid derivative 8 was used instead of the methacrylic acid derivative 6.

Synthesis Example 31: Synthesis of Copolymer 31

17.6 g of 2-naphthoic acid was gradually added to 23.3 g of propylene glycol which had been heated to 80 degrees C. Thereafter, 1.0 g of sulfuric acid was added and the thus-obtained mixture was heated to 115 degrees C. and stirred for 4 hours. Subsequent to cooling down to 40 degrees C., an aqueous solution in which 8.5 g of sodium hydrogen carbonate was dissolved in 50 mL of water was added and the resultant was stirred for 15 minutes. 50 mL of toluene was added to the thus-obtained mixture to isolate the organic phase and thereafter toluene was distilled away. The residual obtained by distilling away the solvent was refined by silica gel column chromatography with a solvent mixture of methylene chloride and methanol with a volume ratio of 98:2 serving as an eluent to obtain 21.2 g of Intermediate 14 illustrated below.

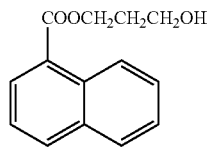

Intermediate 14

4.53 g of acrylic acid chloride (manufactured by Tokyo Chemical Industry Co., Ltd.), 11.5 g of Intermediate 14, and 5.32 g of triethylamine (manufactured by Tokyo Chemical Industry Co., Ltd.) were dissolved in 50 mL of methylene chloride and stirred at room temperature for 4 hours. The thus-obtained reaction solution was rinsed with water and thereafter the organic phase was isolated followed by drying with magnesium sulfate and the solvent was distilled away. The residual was refined by silica gel column chromatography with a solvent mixture of methylene chloride and hexane with a volume ratio of 8:2 serving as an eluent to obtain 12.0 g of acrylic acid derivative 6 illustrated below.

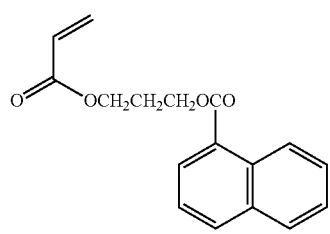

Acrylic acid derivative 6

4.00 g of the acrylic acid derivative 6 was dissolved in 6.00 g of styrene (manufactured by Tokyo Chemical Industry Co., Ltd.), and 12.0 g of deionized water, 0.20 g of Aqualon BC-10 (manufactured by DKS Co. Ltd.), and 0.05 g of ammonium persulfate were added to form a pre-emulsion with a homomixer. Thereafter, 0.20 g of Aqualon BC-10 was added to 10.0 g of deionized water which had been heated to 80 degrees C. in argon atmosphere. Thereafter, 10 percent of the pre-emulsion was added to cause initial polymerization for 30 minutes. Thereafter, the rest of the pre-emulsion was dripped in two hours to cause polymerization followed by further polymerization at 80 degrees C. for two hours. Subsequent to cooling down, the resultant was filtered and neutralized with ammonium water to obtain Copolymer 31 (weight average molecular weight (Mw) of 44,500, number average molecular weight (Mn) of 22,200) having a solid portion concentration of 30 percent by mass.

Synthesis Example 32: Synthesis of Copolymer 32

17.6 g of 2-naphthoic acid was gradually added to 41.1 g of dipropylene glycol which had been heated to 80 degrees C. Thereafter, 1.0 g of sulfuric acid was added and the thus-obtained mixture was heated to 115 degrees C. and stirred for 4 hours. Subsequent to cooling down to 40 degrees C., an aqueous solution in which 8.5 g of sodium hydrogen carbonate was dissolved in 50 mL of water was added and the resultant was stirred for 15 minutes. 50 mL of toluene was added to the thus-obtained mixture to isolate the organic phase and thereafter toluene was distilled away. The residual obtained by distilling away the solvent was refined by silica gel column chromatography with a solvent mixture of methylene chloride and methanol with a volume ratio of 98:2 serving as an eluent to obtain 26.6 g of Intermediate 15 illustrated below.

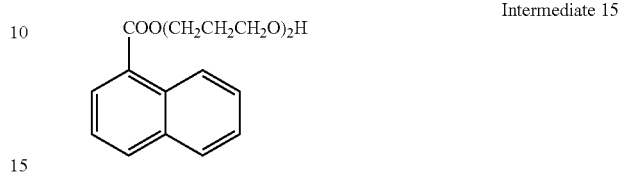

Intermediate 15

4.53 g of acrylic acid chloride (manufactured by Tokyo Chemical Industry Co., Ltd.), 14.4 g of Intermediate 15, and 5.32 g of triethylamine (manufactured by Tokyo Chemical Industry Co., Ltd.) were dissolved in 50 mL of methylene chloride and stirred at room temperature for 4 hours. The thus-obtained reaction solution was rinsed with water and thereafter the organic phase was isolated followed by drying with magnesium sulfate and the solvent was distilled away. The residual was refined by silica gel column chromatography with a solvent mixture of methylene chloride and hexane with a volume ratio of 8:2 serving as an eluent to obtain 14.8 g of acrylic acid derivative 7 illustrated below.

Acrylic acid derivative 7

Copolymer 32 having a solid portion concentration of 30 percent (weight average molecular weight (Mw) of 44,900, number average molecular weight (Mn) of 22,900) was obtained in the same manner as in Synthesis Example 31 except that the acrylic acid derivative 7 was used instead of the acrylic acid derivative 6.

Synthesis Example 33: Synthesis of Copolymer 33

17.9 g of 2-naphthoic acid was gradually added to 60.0 g of dipropylene glycol which had been heated to 80 degrees C. Thereafter, 1.0 g of sulfuric acid was added and the thus-obtained mixture was heated to 115 degrees C. and stirred for 4 hours. Subsequent to cooling down to 40 degrees C., an aqueous solution in which 8.5 g of sodium hydrogen carbonate was dissolved in 50 mL of water was added and the resultant was stirred for 15 minutes. 50 mL of toluene was added to the thus-obtained mixture to isolate the organic phase and thereafter toluene was distilled away. The residual obtained by distilling away the solvent was refined by silica gel column chromatography with a solvent mixture of methylene chloride and methanol with a volume ratio of 98:2 serving as an eluent to obtain 32.2 g of Intermediate 16 intermediate below.

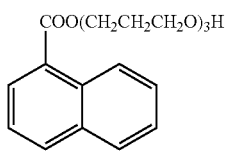

Intermediate 16

4.53 g of acrylic acid chloride (manufactured by Tokyo Chemical Industry Co., Ltd.), 17.3 g of Intermediate 16, and 5.32 g of triethylamine (manufactured by Tokyo Chemical Industry Co., Ltd.) were dissolved in 50 mL of methylene chloride and stirred at room temperature for 4 hours. The thus-obtained reaction solution was rinsed with water and thereafter the organic phase was isolated followed by drying with magnesium sulfate and the solvent was distilled away. The residual was refined by silica gel column chromatography with a solvent mixture of methylene chloride and hexane with a volume ratio of 8:2 serving as an eluent to obtain 17.1 g of acrylic acid derivative 8 illustrated below.

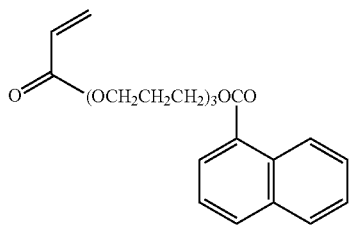

Acrylic acid derivative 8

Copolymer 33 having a solid portion concentration of 30 percent (weight average molecular weight (Mw) of 45,300, number average molecular weight (Mn) of 23,800) was obtained in the same manner as in Synthesis Example 31 except that the acrylic acid derivative 8 was used instead of the acrylic acid derivative 6.

Synthesis Example 34: Synthesis of Copolymer 34

2.00 g of the acrylic acid derivative 6 was dissolved in 8.00 g of styrene (manufactured by Tokyo Chemical Industry Co., Ltd.), and 12.0 g of deionized water, 0.20 g of Aqualon BC-10 (manufactured by DKS Co. Ltd.), and 0.05 g of ammonium persulfate were added to form a pre-emulsion with a homomixer. Thereafter, 0.20 g of Aqualon BC-10 was added to 10.0 g of deionized water which had been heated to 80 degrees C. in argon atmosphere. Thereafter, 10 percent of the pre-emulsion was added to cause initial polymerization for 30 minutes. Thereafter, the rest of the pre-emulsion was dripped in two hours to cause polymerization followed by further polymerization at 80 degrees C. for two hours. Subsequent to cooling down, the resultant was filtered and neutralized with ammonium water to obtain Copolymer 34 (weight average molecular weight (Mw) of 43,300, number average molecular weight (Mn) of 26,100) having a solid portion concentration of 30 percent by mass.

Synthesis Example 35: Synthesis of Copolymer 35

Copolymer 35 having a solid portion concentration of 30 percent (weight average molecular weight (Mw) of 42,100, number average molecular weight (Mn) of 22,000) was obtained in the same manner as in Synthesis Example 34 except that the acrylic acid derivative 7 was used instead of the acrylic acid derivative 6.

Synthesis Example 36: Synthesis of Copolymer 36

1.00 g of the acrylic acid derivative 6 was dissolved in 9.00 g of styrene (manufactured by Tokyo Chemical Industry Co., Ltd.), and 12.0 g of deionized water, 0.20 g of Aqualon BC-10 (manufactured by DKS Co. Ltd.), and 0.05 g of ammonium persulfate were added to form a pre-emulsion with a homomixer. Thereafter, 0.20 g of Aqualon BC-10 was added to 10.0 g of deionized water which had been heated to 80 degrees C. in argon atmosphere. Thereafter, 10 percent of the pre-emulsion was added to cause initial polymerization for 30 minutes. Thereafter, the rest of the pre-emulsion was dripped in two hours to cause polymerization followed by further polymerization at 80 degrees C. for two hours. Subsequent to cooling down, the resultant was filtered and neutralized with ammonium water to obtain Copolymer 36 (weight average molecular weight (Mw) of 43,500, number average molecular weight (Mn) of 26,200) having a solid portion concentration of 30 percent by mass.

Monomer Synthesis 37: Synthesis of Monomer 37

Copolymer 37 having a solid portion concentration of 30 percent (weight average molecular weight (Mw) of 44,400, number average molecular weight (Mn) of 25,900) was obtained in the same manner as in Synthesis Example 36 except that the acrylic acid derivative 7 was used instead of the acrylic acid derivative 6.

Synthesis Example 38: Synthesis of Copolymer 38

30.0 g of 3-bromo-1-propanol and 31.1 g of 1-naphthol was dissolved in 150 mL of methyl ethyl ketone, 75.0 g of potassium carbonate was added and refluxed for 12 hours. The obtained reaction solution was filtered, and the filtrate was rinsed with water. The organic phase was isolated and dried by magnesium sulfate, and the solvent was evaporated. The residual was refined by silica gel column chromatography with a solvent mixture of methylene chloride and hexane with a volume ratio of 8:2 serving as an eluent to obtain 37.6 g of Intermediate 17 illustrated below.

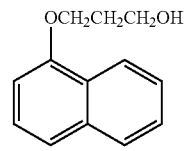

Intermediate 17

4.53 g of acrylic acid chloride (manufactured by Tokyo Chemical Industry Co., Ltd.), 10.1 g of Intermediate 17, and 5.32 g of triethylamine (manufactured by Tokyo Chemical Industry Co., Ltd.) were dissolved in 50 mL of methylene chloride and stirred at room temperature for 4 hours. The thus-obtained reaction solution was rinsed with water and thereafter the organic phase was isolated followed by drying with magnesium sulfate and the solvent was distilled away. The residual was refined by silica gel column chromatography with a solvent mixture of methylene chloride and hexane with a volume ratio of 8:2 serving as an eluent to obtain 9.8 g of acrylic acid derivative 9 illustrated below.

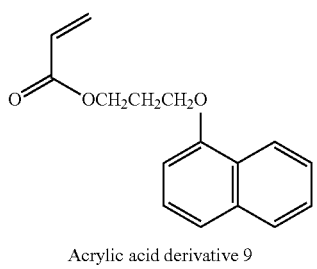

Acrylic acid derivative 9

2.00 g of the acrylic acid derivative 9 was dissolved in 8.00 g of styrene (manufactured by Tokyo Chemical Industry Co., Ltd.), and 12.0 g of deionized water, 0.20 g of Aqualon BC-10 (manufactured by DKS Co. Ltd.), and 0.05 g of ammonium persulfate were added to form a pre-emulsion with a homomixer. Thereafter, 0.20 g of Aqualon BC-10 was added to 10.0 g of deionized water which had been heated to 80 degrees C. in argon atmosphere. Thereafter, 10 percent of the pre-emulsion was added to cause initial polymerization for 30 minutes. Thereafter, the rest of the pre-emulsion was dripped in two hours to cause polymerization followed by further polymerization at 80 degrees C. for two hours. Subsequent to cooling down, the resultant was filtered and neutralized with ammonium water to obtain Copolymer 38 (weight average molecular weight (Mw) of 39,000, number average molecular weight (Mn) of 20,300) having a solid portion concentration of 30 percent by mass.

Synthesis Example 39: Synthesis of Copolymer 39

1.00 g of the acrylic acid derivative 9 was dissolved in 9.00 g of styrene (manufactured by Tokyo Chemical Industry Co., Ltd.), and 12.0 g of deionized water, 0.20 g of Aqualon BC-10 (manufactured by DKS Co. Ltd.), and 0.05 g of ammonium persulfate were added to form a pre-emulsion with a homomixer. Thereafter, 0.20 g of Aqualon BC-10 was added to 10.0 g of deionized water which had been heated to 80 degrees C. in argon atmosphere. Thereafter, 10 percent of the pre-emulsion was added to cause initial polymerization for 30 minutes. Thereafter, the rest of the pre-emulsion was dripped in two hours to cause polymerization followed by further polymerization at 80 degrees C. for two hours. Subsequent to cooling down, the resultant was filtered and neutralized with ammonium water to obtain Copolymer 39 (weight average molecular weight (Mw) of 40,100, number average molecular weight (Mn) of 21,000) having a solid portion concentration of 30 percent by mass.

Synthesis Example 40: Synthesis of Copolymer 40

0.50 g of the acrylic acid derivative 9 was dissolved in 9.50 g of styrene (manufactured by Tokyo Chemical Industry Co., Ltd.), and 12.0 g of deionized water, 0.20 g of Aqualon BC-10 (manufactured by DKS Co. Ltd.), and 0.05 g of ammonium persulfate were added to form a pre-emulsion with a homomixer. Thereafter, 0.20 g of Aqualon BC-10 was added to 10.0 g of deionized water which had been heated to 80 degrees C. in argon atmosphere. Thereafter, 10 percent of the pre-emulsion was added to cause initial polymerization for 30 minutes. Thereafter, the rest of the pre-emulsion was dripped in two hours to cause polymerization followed by further polymerization at 80 degrees C. for two hours. Subsequent to cooling down, the resultant was filtered and neutralized with ammonium water to obtain Copolymer 40 (weight average molecular weight (Mw) of 39,400, number average molecular weight (Mn) of 20,400) having a solid portion concentration of 30 percent by mass.

Synthesis Example 41: Synthesis of Copolymer 41

4.00 g of methacrylic acid derivative 6 and 0.1 g of ethylene glycol diacrylate were dissolved in 6.00 g of styrene (manufactured by Tokyo Chemical Industry Co., Ltd.), and 12.0 g of deionized water, 0.20 g of polyoxyethylene nonyl propenyl phenyl ether ammonium sulfate (Aqualon BC-10, manufactured by DKS Co. Ltd.), and 0.05 g of ammonium persulfate were added to form a pre-emulsion with a homomixer. Thereafter, 0.20 g of Aqualon BC-10 was added to 10.0 g of deionized water which had been heated to 80 degrees C. in argon atmosphere. Thereafter, 10 percent of the pre-emulsion was added to cause initial polymerization for 30 minutes. Thereafter, the rest of the pre-emulsion was dripped in two hours to cause polymerization followed by further polymerization at 80 degrees C. for three hours. Subsequent to cooling down, the resultant was neutralized with ammonium water to obtain Copolymer 41 having a solid portion concentration of 30 percent by mass.

Synthesis Example 42: Synthesis of Copolymer 42

4.00 g of methacrylic acid derivative 7 and 0.2 g of ethylene glycol diacrylate were dissolved in 6.00 g of styrene (manufactured by Tokyo Chemical Industry Co., Ltd.), and 12.0 g of deionized water, 0.20 g of polyoxyethylene nonyl propenyl phenyl ether ammonium sulfate (Aqualon BC-10, manufactured by DKS Co. Ltd.), and 0.05 g of ammonium persulfate were added to form a pre-emulsion with a homomixer. Thereafter, 0.20 g of Aqualon BC-10 was added to 10.0 g of deionized water which had been heated to 80 degrees C. in argon atmosphere. Thereafter, 10 percent of the pre-emulsion was added to cause initial polymerization for 30 minutes. Thereafter, the rest of the pre-emulsion was dripped in two hours to cause polymerization followed by further polymerization at 80 degrees C. for three hours. Subsequent to cooling down, the resultant was neutralized with ammonium water to obtain Copolymer 42 having a solid portion concentration of 30 percent by mass.

Synthesis Example 43: Synthesis of Copolymer 43

4.00 g of methacrylic acid derivative 8 and 0.3 g of ethylene glycol diacrylate were dissolved in 6.00 g of styrene (manufactured by Tokyo Chemical Industry Co., Ltd.), and 12.0 g of deionized water, 0.20 g of polyoxyethylene nonyl propenyl phenyl ether ammonium sulfate (Aqualon BC-10, manufactured by DKS Co. Ltd.), and 0.05 g of ammonium persulfate were added to form a pre-emulsion with a homomixer. Thereafter, 0.20 g of Aqualon BC-10 was added to 10.0 g of deionized water which had been heated to 80 degrees C. in argon atmosphere. Thereafter, 10 percent of the pre-emulsion was added to cause initial polymerization for 30 minutes. Thereafter, the rest of the pre-emulsion was dripped in two hours to cause polymerization followed by further polymerization at 80 degrees C. for three hours. Subsequent to cooling down, the resultant was neutralized with ammonium water to obtain Copolymer 43 having a solid portion concentration of 30 percent by mass.

Synthesis Example 44: Synthesis of Copolymer 44

4.00 g of acrylic acid derivative 6 and 0.1 g of ethylene glycol diacrylate were dissolved in 6.00 g of styrene (manufactured by Tokyo Chemical Industry Co., Ltd.), and 12.0 g of deionized water, 0.20 g of polyoxyethylene nonyl propenyl phenyl ether ammonium sulfate (Aqualon BC-10, manufactured by DKS Co. Ltd.), and 0.05 g of ammonium persulfate were added to form a pre-emulsion with a homomixer. Thereafter, 0.20 g of Aqualon BC-10 was added to 10.0 g of deionized water which had been heated to 80 degrees C. in argon atmosphere. Thereafter, 10 percent of the pre-emulsion was added to cause initial polymerization for 30 minutes. Thereafter, the rest of the pre-emulsion was dripped in two hours to cause polymerization followed by further polymerization at 80 degrees C. for three hours. Subsequent to cooling down, the resultant was neutralized with ammonium water to obtain Copolymer 44 having a solid portion concentration of 30 percent by mass.

Synthesis Example 45: Synthesis of Copolymer 45

4.00 g of acrylic acid derivative 7 and 0.2 g of ethylene glycol diacrylate were dissolved in 6.00 g of styrene (manufactured by Tokyo Chemical Industry Co., Ltd.), and 12.0 g of deionized water, 0.20 g of polyoxyethylene nonyl propenyl phenyl ether ammonium sulfate (Aqualon BC-10, manufactured by DKS Co. Ltd.), and 0.05 g of ammonium persulfate were added to form a pre-emulsion with a homomixer. Thereafter, 0.20 g of Aqualon BC-10 was added to 10.0 g of deionized water which had been heated to 80 degrees C. in argon atmosphere. Thereafter, 10 percent of the pre-emulsion was added to cause initial polymerization for 30 minutes. Thereafter, the rest of the pre-emulsion was dripped in two hours to cause polymerization followed by further polymerization at 80 degrees C. for three hours. Subsequent to cooling down, the resultant was neutralized with ammonium water to obtain Copolymer 45 having a solid portion concentration of 30 percent by mass.

Synthesis Example 46: Synthesis of Copolymer 46

4.00 g of acrylic acid derivative 8 and 0.3 g of ethylene glycol diacrylate were dissolved in 6.00 g of styrene (manufactured by Tokyo Chemical Industry Co., Ltd.), and 12.0 g of deionized water, 0.20 g of polyoxyethylene nonyl propenyl phenyl ether ammonium sulfate (Aqualon BC-10, manufactured by DKS Co. Ltd.), and 0.05 g of ammonium persulfate were added to form a pre-emulsion with a homomixer. Thereafter, 0.20 g of Aqualon BC-10 was added to 10.0 g of deionized water which had been heated to 80 degrees C. in argon atmosphere. Thereafter, 10 percent of the pre-emulsion was added to cause initial polymerization for 30 minutes. Thereafter, the rest of the pre-emulsion was dripped in two hours to cause polymerization followed by further polymerization at 80 degrees C. for three hours. Subsequent to cooling down, the resultant was neutralized with ammonium water to obtain Copolymer 46 having a solid portion concentration of 30 percent by mass.

Synthesis Example 47: Synthesis of Copolymer 47

4.00 g of methacrylic acid derivative 1 and 0.10 g of ethylene glycol diacrylate were dissolved in 6.00 g of styrene (manufactured by Tokyo Chemical Industry Co., Ltd.), and 12.0 g of deionized water, 0.20 g of polyoxyethylene nonyl propenyl phenyl ether ammonium sulfate (Aqualon BC-10, manufactured by DKS Co. Ltd.), and 0.05 g of ammonium persulfate were added to form a pre-emulsion with a homomixer. Thereafter, 0.20 g of Aqualon BC-10 was added to 10.0 g of deionized water which had been heated to 80 degrees C. in argon atmosphere. Thereafter, 10 percent of the pre-emulsion was added to cause initial polymerization for 30 minutes. Thereafter, the rest of the pre-emulsion was dripped in two hours to cause polymerization followed by further polymerization at 80 degrees C. for three hours. Subsequent to cooling down, the resultant was neutralized with ammonium water to obtain Copolymer 47 having a solid portion concentration of 30 percent by mass.

Synthesis Example 48: Synthesis of Copolymer 48

4.00 g of methacrylic acid derivative 2 and 0.20 g of ethylene glycol diacrylate were dissolved in 6.00 g of styrene (manufactured by Tokyo Chemical Industry Co., Ltd.), and 12.0 g of deionized water, 0.20 g of polyoxyethylene nonyl propenyl phenyl ether ammonium sulfate (Aqualon BC-10, manufactured by DKS Co. Ltd.), and 0.05 g of ammonium persulfate were added to form a pre-emulsion with a homomixer. Thereafter, 0.20 g of Aqualon BC-10 was added to 10.0 g of deionized water which had been heated to 80 degrees C. in argon atmosphere. Thereafter, 10 percent of the pre-emulsion was added to cause initial polymerization for 30 minutes. Thereafter, the rest of the pre-emulsion was dripped in two hours to cause polymerization followed by further polymerization at 80 degrees C. for three hours. Subsequent to cooling down, the resultant was neutralized with ammonium water to obtain Copolymer 48 having a solid portion concentration of 30 percent by mass.

Synthesis Example 49: Synthesis of Copolymer 49

4.00 g of methacrylic acid derivative 3 and 0.30 g of ethylene glycol diacrylate were dissolved in 6.00 g of styrene (manufactured by Tokyo Chemical Industry Co., Ltd.), and 12.0 g of deionized water, 0.20 g of polyoxyethylene nonyl propenyl phenyl ether ammonium sulfate (Aqualon BC-10, manufactured by DKS Co. Ltd.), and 0.05 g of ammonium persulfate were added to form a pre-emulsion with a homomixer. Thereafter, 0.20 g of Aqualon BC-10 was added to 10.0 g of deionized water which had been heated to 80 degrees C. in argon atmosphere. Thereafter, 10 percent of the pre-emulsion was added to cause initial polymerization for 30 minutes. Thereafter, the rest of the pre-emulsion was dripped in two hours to cause polymerization followed by further polymerization at 80 degrees C. for three hours. Subsequent to cooling down, the resultant was neutralized with ammonium water to obtain Copolymer 49 having a solid portion concentration of 30 percent by mass.

Synthesis Example 50: Synthesis of Copolymer 50

4.00 g of acrylic acid derivative 1 and 0.10 g of ethylene glycol diacrylate were dissolved in 6.00 g of styrene (manufactured by Tokyo Chemical Industry Co., Ltd.), and 12.0 g of deionized water, 0.20 g of polyoxyethylene nonyl propenyl phenyl ether ammonium sulfate (Aqualon BC-10, manufactured by DKS Co. Ltd.), and 0.05 g of ammonium persulfate were added to form a pre-emulsion with a homomixer. Thereafter, 0.20 g of Aqualon BC-10 was added to 10.0 g of deionized water which had been heated to 80 degrees C. in argon atmosphere. Thereafter, 10 percent of the pre-emulsion was added to cause initial polymerization for 30 minutes. Thereafter, the rest of the pre-emulsion was dripped in two hours to cause polymerization followed by further polymerization at 80 degrees C. for three hours. Subsequent to cooling down, the resultant was neutralized with ammonium water to obtain Copolymer 50 having a solid portion concentration of 30 percent by mass.

Synthesis Example 51: Synthesis of Copolymer 51

4.00 g of acrylic acid derivative 2 and 0.20 g of ethylene glycol diacrylate were dissolved in 6.00 g of styrene (manufactured by Tokyo Chemical Industry Co., Ltd.), and 12.0 g of deionized water, 0.20 g of polyoxyethylene nonyl propenyl phenyl ether ammonium sulfate (Aqualon BC-10, manufactured by DKS Co. Ltd.), and 0.05 g of ammonium persulfate were added to form a pre-emulsion with a homo-mixer. Thereafter, 0.20 g of Aqualon BC-10 was added to 10.0 g of deionized water which had been heated to 80 degrees C. in argon atmosphere. Thereafter, 10 percent of the pre-emulsion was added to cause initial polymerization for 30 minutes. Thereafter, the rest of the pre-emulsion was dripped in two hours to cause polymerization followed by further polymerization at 80 degrees C. for three hours. Subsequent to cooling down, the resultant was neutralized with ammonium water to obtain Copolymer 51 having a solid portion concentration of 30 percent by mass.

Synthesis Example 52: Synthesis of Copolymer 52

4.00 g of acrylic acid derivative 3 and 0.30 g of ethylene glycol diacrylate were dissolved in 6.00 g of styrene (manufactured by Tokyo Chemical Industry Co., Ltd.), and 12.0 g of deionized water, 0.20 g of polyoxyethylene nonyl propenyl phenyl ether ammonium sulfate (Aqualon BC-10, manufactured by DKS Co. Ltd.), and 0.05 g of ammonium persulfate were added to form a pre-emulsion with a homo-mixer. Thereafter, 0.20 g of Aqualon BC-10 was added to 10.0 g of deionized water which had been heated to 80 degrees C. in argon atmosphere. Thereafter, 10 percent of the pre-emulsion was added to cause initial polymerization for 30 minutes. Thereafter, the rest of the pre-emulsion was dripped in two hours to cause polymerization followed by further polymerization at 80 degrees C. for three hours. Subsequent to cooling down, the resultant was neutralized with ammonium water to obtain Copolymer 52 having a solid portion concentration of 30 percent by mass.

Examples 21 to 52

Inks of Examples 21 to 52 were obtained in the same manner as in Example 1 except that the copolymers 21 to 52 (solid portion of 30 percent) prepared in Synthesis Examples 21 to 52 were used in place of Copolymer 1 used in Example 1.

Details of the materials of Copolymers 21 to 40 are shown in Table 3. Properties of each ink prepared in Examples were evaluated in the following manner. The results are shown in Table 4.

TABLE 3

| | | 1:3 | 3 | | | | |
|---|---|---|---|---|---|---|---|
| | | Molar ratio | q | N | Q | Mw | Mn |
| Synthesis Example 21 | Copolymer 21 | 60:40 | 1 | Carbonyl | 3-biphenyl | 44,000 | 21,700 |
| Synthesis Example 22 | Copolymer 22 | 60:40 | 2 | Carbonyl | 3-biphenyl | 47,000 | 22,900 |
| Synthesis Example 23 | Copolymer 23 | 60:40 | 3 | Carbonyl | 3-biphenyl | 38,300 | 18,800 |
| Synthesis Example 24 | Copolymer 24 | 80:20 | 1 | Carbonyl | 3-biphenyl | 44,100 | 27,100 |
| Synthesis Example 25 | Copolymer 25 | 80:20 | 2 | Carbonyl | 3-biphenyl | 41,200 | 22,200 |
| Synthesis Example 26 | Copolymer 26 | 90:10 | 1 | Carbonyl | 3-biphenyl | 40,300 | 25,300 |
| Synthesis Example 27 | Copolymer 27 | 90:10 | 2 | Carbonyl | 3-biphenyl | 44,000 | 25,000 |
| Synthesis Example 28 | Copolymer 28 | 95:5 | 1 | Carbonyl | 3-biphenyl | 41,500 | 21,100 |
| Synthesis Example 29 | Copolymer 29 | 95:5 | 2 | Carbonyl | 3-biphenyl | 40,800 | 20,500 |
| Synthesis Example 30 | Copolymer 30 | 95:5 | 3 | Carbonyl | 3-biphenyl | 42,700 | 22,800 |
| Synthesis Example 31 | Copolymer 31 | 60:40 | 1 | Carbonyl | 2-naphthyl | 44,500 | 22,200 |
| Synthesis Example 32 | Copolymer 32 | 60:40 | 2 | Carbonyl | 2-naphthyl | 44,900 | 22,900 |

TABLE 3-continued

|  |  | 1:3 | | 3 | | | |
|---|---|---|---|---|---|---|---|
|  |  | Molar ratio | q | N | Q | Mw | Mn |
| Synthesis Example 33 | Copolymer 33 | 60:40 | 3 | Carbonyl | 2-naphthyl | 45,300 | 23,800 |
| Synthesis Example 34 | Copolymer 34 | 80:20 | 1 | Carbonyl | 2-naphthyl | 43,300 | 26,100 |
| Synthesis Example 35 | Copolymer 35 | 80:20 | 2 | Carbonyl | 2-naphthyl | 42,100 | 22,000 |
| Synthesis Example 36 | Copolymer 36 | 90:10 | 1 | Carbonyl | 2-naphthyl | 43,500 | 26,200 |
| Synthesis Example 37 | Copolymer 37 | 90:10 | 2 | Carbonyl | 2-naphthyl | 44,400 | 25,900 |
| Synthesis Example 38 | Copolymer 38 | 80:20 | 1 | Atomic bonding | 1-naphthyl | 39,000 | 20,300 |
| Synthesis Example 39 | Copolymer 39 | 90:10 | 1 | Atomic bonding | 1-naphthyl | 40,100 | 21,000 |
| Synthesis Example 40 | Copolymer 40 | 95:5 | 1 | Atomic bonding | 1-naphthyl | 39,400 | 20,400 |

TABLE 4

|  |  | Image density | | Storage stability | Beading |
|---|---|---|---|---|---|
|  | Copolymer Kind | Plain paper | Coated paper | | |
| Example 21 | Copolymer 21 | B | B | A | A |
| Example 22 | Copolymer 22 | B | B | A | A |
| Example 23 | Copolymer 23 | B | B | A | A |
| Example 24 | Copolymer 24 | B | A | A | B |
| Example 25 | Copolymer 25 | B | A | A | B |
| Example 26 | Copolymer 26 | B | A | A | B |
| Example 27 | Copolymer 27 | A | A | A | A |
| Example 28 | Copolymer 28 | A | A | A | A |
| Example 29 | Copolymer 29 | A | A | A | A |
| Example 30 | Copolymer 30 | A | A | A | A |
| Example 31 | Copolymer 31 | B | B | A | A |
| Example 32 | Copolymer 32 | B | B | A | B |
| Example 33 | Copolymer 33 | B | B | A | A |
| Example 34 | Copolymer 34 | B | A | A | A |
| Example 35 | Copolymer 35 | B | A | A | A |
| Example 36 | Copolymer 36 | B | A | A | A |
| Example 37 | Copolymer 37 | A | A | A | A |
| Example 38 | Copolymer 38 | A | A | A | A |
| Example 39 | Copolymer 39 | A | A | A | B |
| Example 40 | Copolymer 40 | A | A | A | A |
| Example 41 | Copolymer 41 | B | A | A | A |
| Example 42 | Copolymer 42 | B | A | A | A |
| Example 43 | Copolymer 43 | B | A | A | A |
| Example 44 | Copolymer 44 | B | A | A | A |
| Example 45 | Copolymer 45 | B | A | A | A |
| Example 46 | Copolymer 46 | B | A | A | A |
| Example 47 | Copolymer 47 | B | A | A | A |
| Example 48 | Copolymer 48 | B | A | A | A |
| Example 49 | Copolymer 49 | B | A | A | A |
| Example 50 | Copolymer 50 | B | A | A | A |
| Example 51 | Copolymer 51 | B | A | A | A |
| Example 52 | Copolymer 52 | B | A | A | A |

Having now fully described embodiments of the present invention, it will be apparent to one of ordinary skill in the art that many changes and modifications can be made thereto without departing from the spirit and scope of embodiments of the invention as set forth herein.

What is claimed is:

1. An ink comprising:
water;
a coloring material; and
a polymer comprising a structure unit represented by Chemical formula 1 and a structure unit represented by Chemical formula 2 or Chemical formula 3, Chemical formula 1

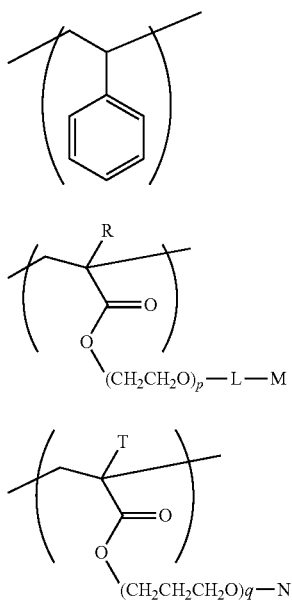

Chemical formula 2

Chemical formula 3

Chemical formula 4

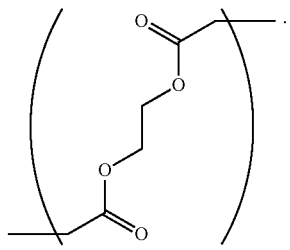

wherein R and T each, independently represent a hydrogen atom or a methyl group, L and N each, independently represent a single bond or a carbonyl group, M and Q each, independently represent a naphthyl group or a biphenyl group, p represents an integer of from 2 to 12, and q represents an integer of from 1 to 3.

2. The ink according to claim 1, wherein the polymer further comprises a structure unit represented by Chemical formula 4, 3. The polymer according to claim 1, wherein a mass ratio of the structure unit represented by Chemical formula 1 to the structure unit represented by Chemical formula 2 or Chemical formula 3 is from 70:30 to 95:5.

4. The ink according to claim 1, wherein L in Chemical formula 2 or N in Chemical formula 3 is a carbonyl group.

5. The ink according to claim 1, wherein a proportion of the polymer in the ink is from 0.5 to 12 percent by mass.

6. The ink according to claim 1, wherein the coloring material comprises a pigment.

7. The ink according to claim 1, further comprising a water-soluble organic solvent, a surfactant or both.

8. The ink according to claim 1, wherein the polymer comprises a copolymer.

9. An ink accommodating container comprising:
the ink of claim 1.

10. An image forming method comprising:
discharging the ink of claim 1 to a recording medium to form an image thereon.

11. An image forming device comprising:
an ink accommodating container configured to accommodate the ink of claim 1; and
a discharging device configured to discharge the ink to a recording medium.

* * * * *